(12) United States Patent
Schmidt et al.

(10) Patent No.: US 12,738,818 B2
(45) Date of Patent: Sep. 15, 2026

(54) ELECTRIC MOTOR, KITCHEN MACHINE AND ASSEMBLY METHOD

(71) Applicant: Vorwerk & Co. Interholding GmbH, Wuppertal (DE)

(72) Inventors: Dirk Schmidt, Wipperfürth (DE); Kevin Busse, Remscheid (DE); Mirko Rebentisch, Wuppertal (DE); Jörg Reiners, Wuppertal (DE); Andreas Scheuch, Iserlohn (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 209 days.

(21) Appl. No.: 18/209,565

(22) Filed: Jun. 14, 2023

(65) Prior Publication Data

US 2023/0412017 A1 Dec. 21, 2023

(30) Foreign Application Priority Data

Jun. 15, 2022 (EP) .................................... 22179240

(51) Int. Cl.
*H02K 15/026* (2025.01)
*A47J 43/046* (2006.01)
(Continued)

(52) U.S. Cl.
CPC .......... *H02K 15/026* (2013.01); *A47J 43/046* (2013.01); *A47J 43/085* (2013.01);
(Continued)

(58) Field of Classification Search
CPC ...... H02K 1/2706; H02K 1/2773; H02K 3/50; H02K 7/04; H02K 11/20; H02K 15/022;
(Continued)

(56) References Cited

U.S. PATENT DOCUMENTS 5,829,120 A 11/1998 Uchida et al.
9,246,364 B2 * 1/2016 Brahmavar .............. H02K 3/02
(Continued)

FOREIGN PATENT DOCUMENTS

CN 103023262 A 4/2013
CN 104620477 A 5/2015
(Continued)

OTHER PUBLICATIONS

U.S. Appl. No. 18/209,570, filed Jun. 14, 2023, Schmidt et al.
U.S. Appl. No. 18/209,574, filed Jun. 14, 2023, Schmidt et al.

*Primary Examiner* — Christopher M Koehler
*Assistant Examiner* — Riley Owen Stout
(74) *Attorney, Agent, or Firm* — Jason H. Vick; Amped IP LLC

(57) ABSTRACT

An electric motor, in particular for a kitchen machine, is proposed, wherein the rotor of the electric motor comprises a mounting device for mounting permanent magnets inserted in the rotor. The mounting device has a base body and flexible fixing elements projecting from the base body for fixing the permanent magnets, which press the permanent magnets in the radial direction against corresponding stops. Alternatively or additionally, the mounting device can form receiving chambers for receiving overdosed adhesive when bonding the permanent magnets. Further, a kitchen machine having a corresponding electric motor is proposed. Furthermore, a method for assembling an electric motor is proposed in which a permanent magnet is adhesively bonded. For this purpose, a mounting device is used which presses the permanent magnet in the radial direction against a corresponding stop by means of a fixing element in order to fix the permanent magnet during the curing of adhesive, and/or which receives overdosed adhesive in a receiving chamber.

22 Claims, 12 Drawing Sheets

(51) Int. Cl.

| | |
|---|---|
| ***A47J 43/08*** | (2006.01) |
| ***H02K 1/14*** | (2006.01) |
| ***H02K 3/34*** | (2006.01) |
| ***H02K 3/50*** | (2006.01) |
| ***H02K 3/52*** | (2006.01) |
| ***H02K 5/22*** | (2006.01) |
| ***H02K 11/20*** | (2016.01) |
| ***H02K 11/25*** | (2016.01) |
| ***H02K 15/022*** | (2025.01) |
| ***H02K 15/03*** | (2025.01) |
| ***H02K 21/16*** | (2006.01) |

(52) U.S. Cl.

CPC ............... *H02K 3/345* (2013.01); *H02K 3/50* (2013.01); *H02K 5/225* (2013.01); *H02K 11/20* (2016.01); *H02K 15/022* (2013.01); *H02K 15/03* (2013.01); *H02K 21/16* (2013.01); *H02K 1/146* (2013.01); *H02K 3/522* (2013.01); *H02K 11/25* (2016.01); *H02K 2203/12* (2013.01)

(58) Field of Classification Search

CPC ...... H02K 15/03; H02K 15/12; H02K 15/165; H02K 21/16; H02K 3/345; H02K 5/225; H02K 2203/03; H02K 2203/06; H02K 11/25; H02K 3/522; H02K 2213/03; A47J 43/046; A47J 43/085

See application file for complete search history.

(56) References Cited

U.S. PATENT DOCUMENTS

| | | | | |
|---|---|---|---|---|
| 2001/0011854 | A1 | 8/2001 | Heyden et al. | |
| 2003/0222521 | A1 | 12/2003 | Mimura | |
| 2008/0036315 | A1 | 2/2008 | Makiuchi et al. | |
| 2008/0084139 | A1 | 4/2008 | Schroer et al. | |
| 2008/0122300 | A1 | 5/2008 | Cho et al. | |
| 2008/0150376 | A1 | 6/2008 | Soda et al. | |
| 2008/0169714 | A1 | 7/2008 | Kataoka et al. | |
| 2009/0309441 | A1 | 12/2009 | Yang et al. | |
| 2010/0052461 | A1 | 3/2010 | Sasaki | |
| 2010/0181852 | A1 | 7/2010 | Kobayashi | |
| 2011/0290581 | A1 | 12/2011 | Neubauer et al. | |
| 2012/0112580 | A1 | 5/2012 | Sato et al. | |
| 2013/0009513 | A1 | 1/2013 | Jang et al. | |
| 2013/0221787 | A1 | 8/2013 | Kritharidou et al. | |
| 2014/0103768 | A1 | 4/2014 | Brahmavar et al. | |
| 2014/0125160 | A1 | 5/2014 | Nara et al. | |
| 2014/0159520 | A1 | 6/2014 | Jang et al. | |
| 2015/0145367 | A1 | 5/2015 | Li et al. | |
| 2015/0194852 | A1 | 7/2015 | Kim et al. | |
| 2015/0249375 | A1 | 9/2015 | Andrieux | |
| 2015/0303751 | A1* | 10/2015 | Ekin | H02K 1/28 310/43 |
| 2016/0172916 | A1 | 6/2016 | El Baraka et al. | |
| 2016/0197530 | A1 | 7/2016 | Fuji et al. | |
| 2016/0282147 | A1 | 9/2016 | Sano et al. | |
| 2017/0256995 | A1 | 9/2017 | Lam et al. | |
| 2017/0268904 | A1 | 9/2017 | Ozaki | |
| 2017/0288518 | A1 | 10/2017 | Matsuura et al. | |
| 2017/0338715 | A1 | 11/2017 | Li et al. | |
| 2018/0316235 | A1 | 11/2018 | Yamada | |
| 2019/0036413 | A1 | 1/2019 | Yamamoto et al. | |
| 2019/0372435 | A1 | 12/2019 | Song | |
| 2020/0003216 | A1 | 1/2020 | Cho et al. | |
| 2020/0076259 | A1 | 3/2020 | Hackl et al. | |
| 2020/0251942 | A1* | 8/2020 | Ueda | H02K 5/16 |
| 2021/0006118 | A1 | 1/2021 | Echizen et al. | |
| 2021/0242731 | A1 | 8/2021 | Beyerl et al. | |
| 2021/0249928 | A1 | 8/2021 | Wang et al. | |
| 2021/0384793 | A1 | 12/2021 | Bailey et al. | |
| 2022/0006347 | A1 | 1/2022 | Fujil | |
| 2022/0085697 | A1 | 3/2022 | Shinoda et al. | |
| 2022/0085698 | A1 | 3/2022 | Niwa et al. | |
| 2023/0119735 | A1 | 4/2023 | Chikaraishi et al. | |
| 2023/0387761 | A1 | 11/2023 | Silvery et al. | |
| 2025/0038586 | A1 | 1/2025 | Cho et al. | |

FOREIGN PATENT DOCUMENTS

| | | | |
|---|---|---|---|
| CN | 212085915 | U | 12/2020 |
| DE | 202009005531 | U1 | 8/2010 |
| DE | 102010039334 | A1 | 2/2012 |
| DE | 102012101757 | A1 | 9/2013 |
| DE | 102012206475 | A1 | 10/2013 |
| DE | 102014117380 | A1 | 5/2015 |
| DE | 102017206091 | B3 | 10/2018 |
| DE | 102020120233 | A1 | 2/2022 |
| DE | 102020126632 | A1 | 4/2022 |
| EP | 0438981 | A1 | 7/1991 |
| EP | 1420499 | A1 | 5/2004 |
| EP | 1796246 | B1 | 3/2010 |
| EP | 1656724 | B1 | 4/2011 |
| EP | 1656726 | B1 | 4/2012 |
| EP | 2830198 | A2 | 1/2015 |
| EP | 3618229 | A1 | 3/2020 |
| EP | 4007125 | A1 | 6/2022 |
| JE | 1557928 | A1 | 5/2005 |
| JP | H08-98466 | A | 4/1996 |
| JP | 2014-195345 | A | 10/2014 |
| KR | 20080067416 | A | 7/2008 |
| KR | 20100063380 | A | 6/2010 |
| WO | WO 2017/076461 | A1 | 5/2017 |
| WO | WO 2018/030611 | A1 | 2/2018 |

* cited by examiner

ELECTRIC MOTOR, KITCHEN MACHINE AND ASSEMBLY METHOD

CROSS-REFERENCE TO RELATED APPLICATIONS

This application claims the benefit under 35 U.S.C. 119(a) to European Patent Application No. 22 179 240.1, filed Jun. 15, 2022, the disclosure of which is incorporated herein by reference in its entirety.

BACKGROUND

The present invention relates to an electric motor, in particular for a kitchen machine, a kitchen machine having an electric motor, and a method of assembling an electric motor.

Electric motors, for example in the form of brushless DC motors, are known from the prior art and have a stator and a rotor rotating relative to the stator. In brushless DC motors, the stator is equipped with stator coils and the rotor with permanent magnets.

The permanent magnets can be provided on the outside of the rotor core (SPM—Surface Permanent Magnet) or embedded in the rotor core (IPM—Interior Permanent Magnet).

Usually, the permanent magnets are adhered/glued/bonded to the rotor core to fix them in place. However, this poses the problem that the permanent magnets have to be held in position or pre-fixed until the adhesive has cured.

A solution known from the prior art is the provision of lugs on the rotor core. The rotor core is made up of stacked electrical sheets, wherein sheet lugs are formed on one or more of the electrical sheets with which the respective permanent magnet is held in position.

However, this makes the sheet cutting of the rotor core more complex because the lug geometry should not normally be present in every sheet, so at least one sheet layer with the lugs is added accordingly. Since the sheet layers are punched with a punching tool, but the number of different sheet geometries is limited in such a tool, the additional sheet layer can possible not be produced in the tool at all.

Another solution known from the prior art provides for additional components which serve only to fix the permanent magnets. Solutions are possible in which the respective component completely fixes the respective permanent magnet—i.e. without the use of adhesive—or only enables pre-fixation of the respective permanent magnet and is removed again after the adhesive has cured. However, the use of additional components makes the structure and/or manufacture of the electromotor more complex and/or more costly.

The use of multiple, additional components is known, for example, from German Patent Application No. DE 10 2014 117 380 A1 and corresponding U.S. Patent Publication No. 2015/0145367 A1. This document relates to a permanent magnet rotor for a brushless motor of the interior permanent magnet (IPM) type. To secure the permanent magnets in the rotor core, a plurality of springs are provided which, in a compressed state, are arranged between the inner radial ends of the respective permanent magnet and an inner annular region of the rotor. By using the springs, adhesive for securing the permanent magnets can be dispensed with.

SUMMARY

The present invention is directed to providing an electric motor, a kitchen machine having an electric motor, and an assembly method for an electric motor, wherein the electric motor has a simple, compact and/or inexpensive construction and/or enables simple, fast and/or inexpensive assembly/manufacture and/or wherein secure and reliable positioning and/or (pre-)fixing of the permanent magnets to the rotor and/or rotor core is ensured.

The problem is solved by an electric motor, a kitchen machine or a method as disclosed herein.

The electric motor according to the proposal has a (fixed) stator and a rotor rotatable relative to the stator about a rotation axis.

The rotor has a rotor body/rotor core which is formed in particular by rotor sheets/rotor lamination and/or electrical sheets/electrical laminations stacked one on top of the other. The rotor core is therefore preferably a lamination/sheet stack or laminated rotor core.

The rotor has a plurality of permanent magnets which are provided or embedded in the rotor core. For this purpose, the rotor core has corresponding magnet receptacles or corresponding magnet receptacles are formed in the rotor core, wherein the magnet receptacles are each delimited/bounded radially outwardly by a (radial) stop.

The spatial assignments, arrangements and/or orientations, in particular the terms "radial", "axial" and/or "circumferential" used in the context of the present invention, refer in particular to the rotation axis of the rotor and/or a rotor shaft of the rotor, unless otherwise specified.

Terms such as "above", "below" and the like preferably refer to the extension of the rotation axis A. In particular, "top" refers to one axial end face of the component concerned, in particular the electric motor, rotor and/or rotor core, and "bottom" refers to the other or opposite axial end face of the component concerned, in particular the electric motor, rotor and/or rotor core.

The terms are used here according to the preferred orientation of the electric motor and/or rotor during mounting/assembly of the permanent magnets. However, it should be noted that the mounting/assembly and/or installation of the electric motor in a kitchen machine or other device can also be carried out in a different orientation.

According to the proposal, the rotor has a mounting device for mounting/assembling the permanent magnets.

According to one aspect of the present invention, the mounting device has a base body and (at least partially) compliant/flexible/elastic fixing elements that serve to (pre) fix the permanent magnets. The fixing elements project from the base body in the axial direction into the magnet receptacles and/or engage in the magnet receptacles in the axial direction and press or clamp the permanent magnets in the radial direction against the respective (radially outward) stops.

Preferably, each magnet receptacle and/or each permanent magnet is assigned (exactly) one fixing element.

In an advantageous manner, by the fixing elements, the permanent magnets are pushed or pressed into the desired position or end position and/or are held or fixed in position there. By means of the fixing elements a secure and reliable positioning and/or (pre-)fixing of the permanent magnets as well as simple and fast assembly/mounting or manufacture is thus achieved.

Particularly preferably, the fixing elements are formed in one piece with the base body. Thus, only one component is required to position and/or fix all the permanent magnets. This is conducive to a simple, compact and cost-effective design/structure of the electric motor and/or rotor and also simplifies assembly/mounting or manufacture.

Preferably, the permanent magnets are (additionally) adhesively bonded to the rotor core and/or the mounting device. The fixing elements serve in particular to position and/or pre-fix the permanent magnets while the adhesive is curing. In this way, a particularly stable and/or secure fixing of the permanent magnets is achieved. In addition, any additional devices required in the prior art to hold the permanent magnets in position while the adhesive cures can also be dispensed with.

Alternatively, however, it is also possible for the fixing to be effected solely by the fixing elements. The respective permanent magnet is preferably clamped between the fixing element and the stop, so that the use of adhesive can be dispensed with.

The fixing elements are preferably elongated and/or arm-like or rib-like.

Preferably, the fixing elements each have a first axial end or connecting arm, the first axial end or connecting arm of the fixing element being (flexibly) connected to the base body of the mounting device. Preferably, the fixing elements each have a second axial or free end or head, the free end or head pressing against or resting against the permanent magnet. In this way, a flexible fixing element is formed in a particularly simple manner.

Particularly preferably, the respective fixing element projects/protrudes at least substantially up to half of the axial extent of the respective magnet receptacle into the latter and/or the respective fixing element presses—in particular with its head—at least substantially centrally onto one side of the permanent magnet, in particular the radially inward-facing (end) side. This achieves a particularly uniform force effect on the permanent magnet.

The radial stops are preferably formed by the rotor core, in particular one or more rotor sheets/laminations of the rotor core. This is conducive to a simple and compact design/structure.

The stops can be designed as webs, in particular if they are formed only by individual rotor sheets.

Preferably, the stops or webs are bent/arched radially inwards and/or into the respective magnet receptacle. This can ensure that the diameter of the rotor does not change even if the stop/web is deflected/deformed. Such deflection/deformation can occur due to the force exerted by the permanent magnet when the permanent magnet is pressed against the stop. Preferably, therefore, the stops are designed to compensate or offset radial forces.

The stops preferably each have noses/lugs which project radially into the magnet receptacles and/or point in the direction of the rotation axis. The lugs preferably form a substantially point-shaped contact surface for the respective permanent magnet.

According to a further aspect of the present invention, which can also be implemented independently, the mounting device (de)limits/bounds the magnet receptacles axially and has one or more reservoirs or receiving chambers which serve to receive (overdosed or excess) adhesive.

Advantageously, adhesive that has been overdosed for tolerance reasons is collected in the receiving chamber(s) so that the excess adhesive does not have to be removed and/or cannot contaminate the production facilities. This is conducive to simple and cost-effective assembly/mounting and/or manufacture. Moreover, stable and secure fixing of the permanent magnets can also be ensured, since the adhesive can be (slightly) overdosed without any problems, so that firm bonding is ensured. Furthermore, a particularly simple and compact design/structure is realized.

A common receiving chamber may be provided for multiple or all magnet receptacles and/or permanent magnets. Alternatively and preferably, each magnet receptacle and/or each permanent magnet is assigned one (own) or more (own) receiving chambers.

Preferably, the mounting device limits/bounds the magnet receptacles axially and/or on the bottom side and/or from below and/or the mounting device forms (respectively) an axial stop or counter bearing for the permanent magnets. For this purpose, the mounting device preferably has one or more, preferably rib-like, contact elements or stop elements.

In particular, the permanent magnets can be inserted or pushed in during mounting/assembly from above and/or on the axial side of the magnet receptacle opposite the mounting device until they hit or contact the mounting device, in particular the stop element(s). This is conducive to simple and safe assembly/mounting as well as simple design/structure of the electric motor and/or rotor.

The used terms "top", "bottom" and the like refer—unless otherwise specified—in particular to the preferred orientation of the electric motor and/or rotor during mounting of the permanent magnets, in which the mounting device is arranged axially below the rotor core. However, the mounting and/or installation of the electric motor in a kitchen machine or other device can also be carried out in a different orientation.

Preferably, the receiving chamber(s) is/are laterally bounded by the stop element(s). In this way, the receiving chambers are realized in a simple manner and/or are formed in the region of the magnet receptacle and/or directly below the permanent magnet. This ensures that the overdosed adhesive remains in the receiving chamber.

The mounting device is preferably injection molded and/or formed in one piece, in particular with the fixing elements and/or receiving chambers. This is conducive to particularly simple and/or cost-effective manufacture with few components.

Preferably, the rotor core and/or the mounting device are/is connected to a shaft of the rotor in a force-fit, form-fit and/or material-fit manner, for example with the aid of notches or by means of a press fit. The mounting device is preferably additionally (directly) connected to the rotor core and/or the permanent magnets by the adhesive bonding.

In addition or alternatively, the mounting device can have fastening elements which fasten the mounting device (directly) to the rotor core—in particular already before the adhesive bonding and/or in addition to the adhesive bonding.

The fastening elements are preferably pin-like and/or project axially into or through the rotor core. Particularly preferably, the fastening elements are heat-staked to the rotor core and/or the fastening elements form a snap connection with the rotor core.

The fastening elements enable a particularly stable and compact design of the rotor.

The fastening elements on the mounting device and/or the connection of the mounting device and the rotor core by means of the fastening elements may also be implemented independently of the fixing of the permanent magnets and/or the formation of adhesive receiving chambers.

Preferably, the rotor has a blower or fan for cooling the electric motor, the blower or fan having or forming the mounting device.

Thus, in addition to ventilation, additional functions—such as positioning and/or fixing the permanent magnets as proposed and/or providing receiving chambers for adhesive—are realized by the fan.

In an advantageous manner, the means for mounting the permanent magnets, in particular for positioning and/or fixing, in particular the fixing elements and/or receiving chambers, are thus formed on and/or integrated in a component already used for other purposes. Additional components for mounting can thus be dispensed with completely. This is conducive to a simple, compact and cost-effective design/structure of the electric motor and/or rotor and also simplifies mounting/assembly and/or manufacture.

Another aspect of the present invention, which can also be implemented independently, relates to a kitchen machine having an electric motor according to the proposal.

The kitchen machine according to the proposal is driven by the electric motor, in particular for chopping and/or stirring or mixing food. Particularly preferably, the kitchen machine has a stirrer, a cutter or the like which can be set in rotation by the electric motor.

By using the proposed electric motor in a kitchen machine, corresponding advantages can be achieved. In particular, the proposed electric motor can be arranged in a particularly space-saving manner in the kitchen machine due to its compact, flat and/or simple design/construction.

In principle, however, the electric motor can also be used in other devices, for example a vacuum cleaner or vacuum robot.

Another aspect of the present invention, which can also be implemented independently, relates to a method of assembling an electric motor and/or a rotor for an electric motor, in which a permanent magnet is inserted or pushed into a magnet receptacle provided in the rotor core and is adhesively bonded thereto. According to the proposal, a mounting device of the rotor is used in the bonding process.

In the method according to the proposal, the mounting device has a flexible fixing element projecting axially into the magnet receptacle. When the permanent magnet is inserted into the magnet receptacle, the fixing element presses and/or clamps the permanent magnet in the radial direction against a stop which radially (de)limits/bounds the magnet receptacle. This positions the permanent magnet and/or fixes the permanent magnet during curing of the adhesive.

A further aspect of the present invention, which can also be implemented independently, relates to a method in which the mounting device—in addition to or as an alternative to the fixing element—has a receiving chamber, wherein (overdosed) adhesive is received in the receiving chamber and/or is introduced/carried into the receiving chamber by the permanent magnet during mounting of the permanent magnet.

The permanent magnet may already be magnetized during insertion and/or adhesive bonding. Preferably, however, the permanent magnet is magnetized in the rotor only after insertion and/or adhesive bonding, in particular only after the adhesive has cured. In this sense, the method according to the proposal thus preferably also comprises the insertion and/or adhesive bonding of still unmagnetized permanent magnets or still unmagnetized, permanently magnetizable components.

Alternatively, however, also already magnetized permanent magnets or already magnetized, permanently magnetizable components may be inserted and/or adhesively bonded.

Corresponding advantages can be achieved by the proposed method. In particular, the electric motor described above and/or its rotor can be assembled and/or manufactured by means of the proposed method.

The aforementioned aspects, features and method steps as well as the aspects, features and method steps of the present invention resulting from the claims and the following description can in principle be realized independently of each other, but also in any combination and/or sequence.

Further aspects, advantages, features, characteristics as well as advantageous further developments of the present invention result from the claims and the following description of preferred embodiments on the basis of the accompanying drawings.

DETAILED DESCRIPTION

In the figures, some of which are not to scale and are merely schematic, the same reference signs are used for the same, similar or like parts and components, wherein corresponding or comparable properties or advantages are achieved, even if repetition is omitted.

For better clarity, in the case of identical parts and components within a figure, not all parts/components are given a reference sign.

Figure 1:
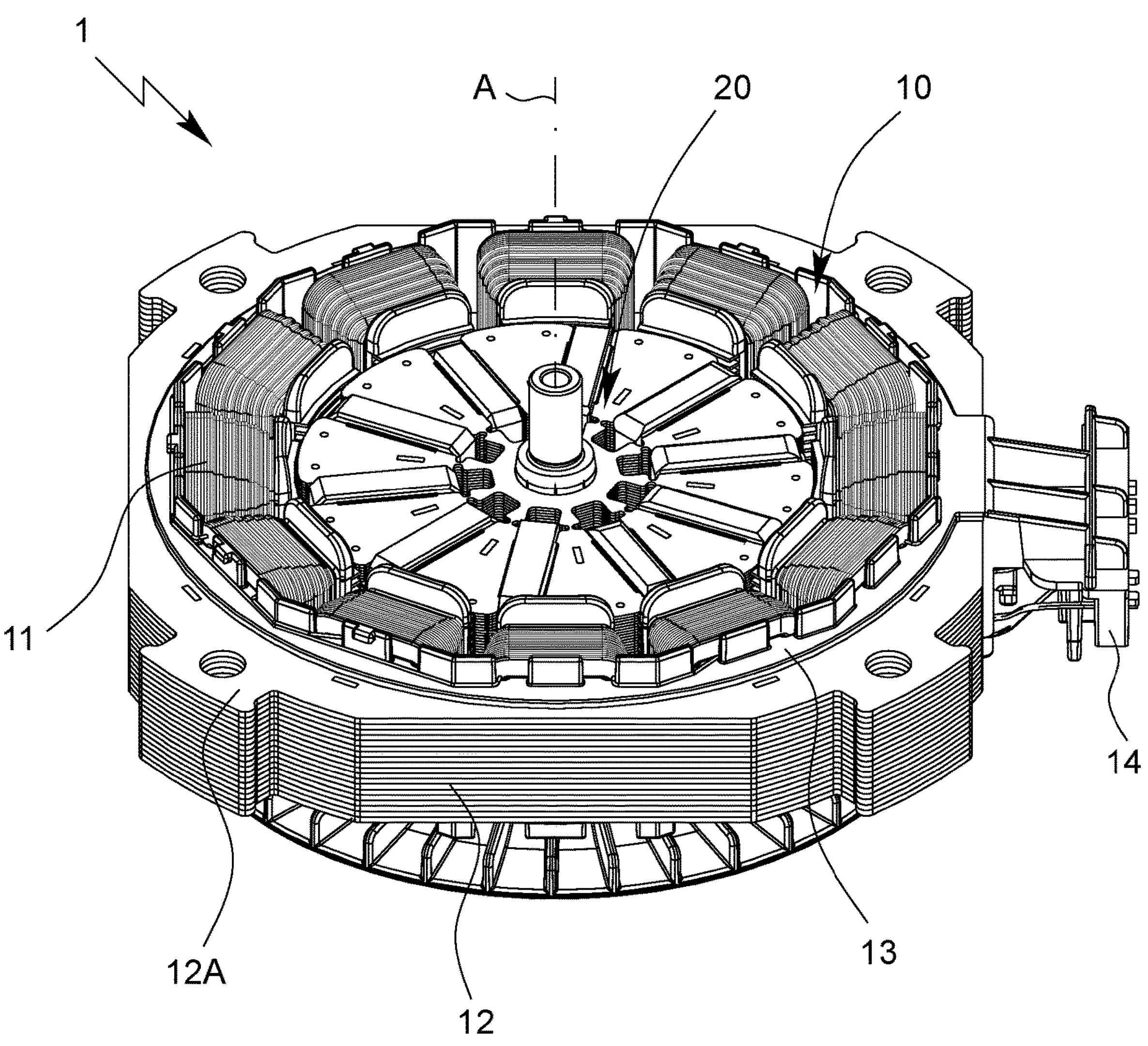
FIG. 1 is a perspective view of a proposed electric motor with a stator and a proposed rotor.

FIG. 1 shows a schematic, perspective view of an electric motor 1 according to the proposal.

In the embodiment shown, the electric motor 1 is designed as a brushless DC motor. However, other solutions are also possible in principle.

The electric motor 1 according to the proposal preferably has a wide (rotational) speed spread and/or can be operated over a wide (rotational) speed range. Preferably, the minimum speed is less than 100, 50 or 20 rpm, in particular less than or equal to 10 rpm, and/or the maximum speed is greater than 2000, 5000 or 8000 rpm, in particular greater than or equal to 10,000 rpm.

The electric motor 1 has a (stationary/fixed) stator 10 and a (rotating/rotatable) rotor 20, the rotor 20 being rotatable about a rotation axis A relative to the stator 10.

As already mentioned at the beginning, terms such as “axial”, “radial” and the like preferably refer to the rotation axis A.

Optionally, the electric motor 1 may have a housing and/or stator 10 and/or rotor 20 may be arranged in a housing (not shown).

In the example shown, the electric motor 1 is designed as an internal rotor motor and/or the rotor 20 is arranged at least partially inside the stator 10. In principle, however, it is also possible to design the proposed electric motor 1 as an external rotor motor (not shown) and/or to provide the proposed assembly method for an external rotor motor.

Figure 2:
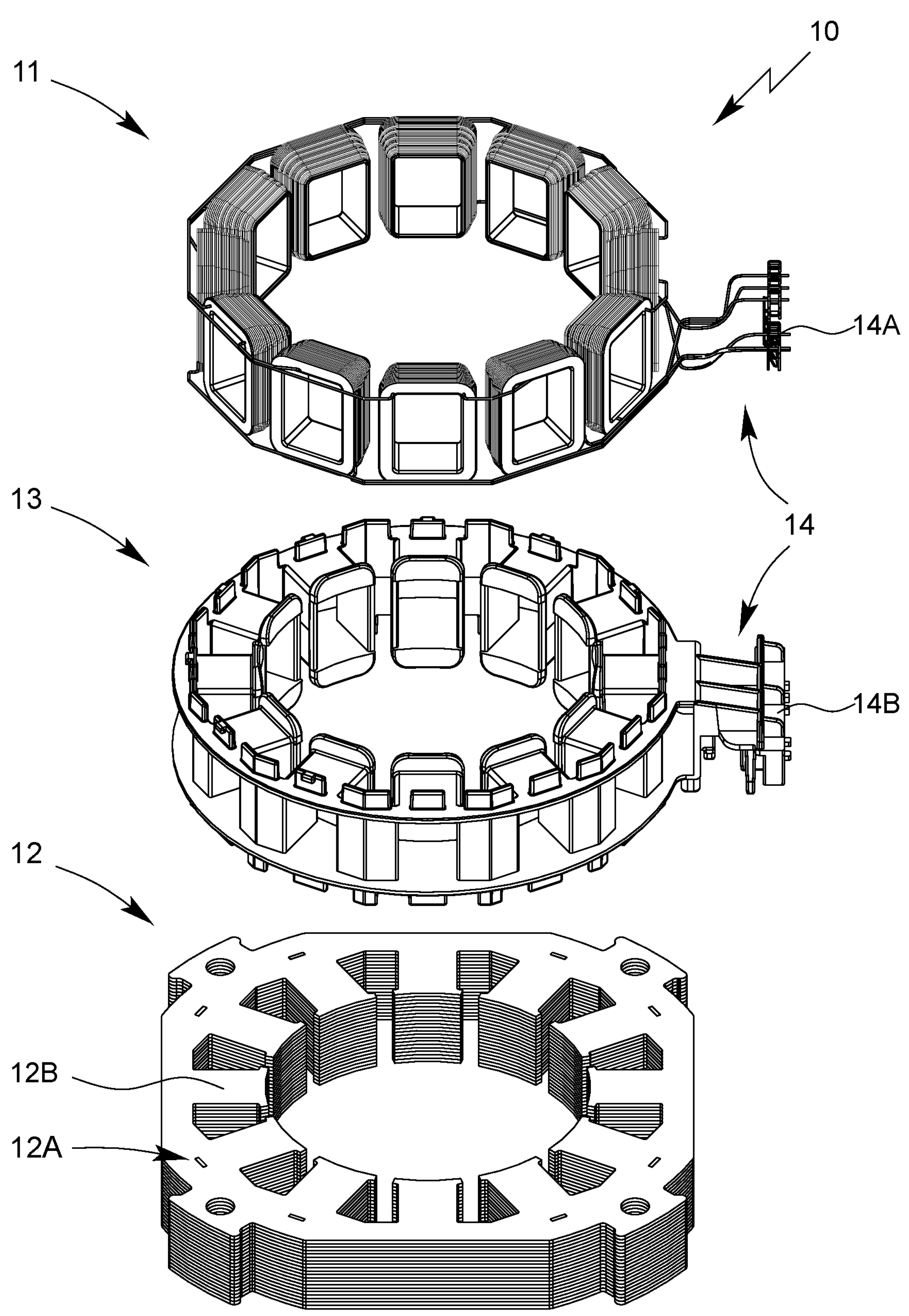
FIG. 2 is an exploded view of the stator according to FIG. 1.

FIG. 2 shows the stator 10 of the electric motor 1 in a schematic exploded view.

The stator 10 has a plurality, here twelve, of windings/coils 11, a stator core 12, a coil carrier 13 and/or a connection device 14.

The stator core 12 preferably comprises a plurality of stacked electrical sheets or stator sheets/stator laminations 12A forming a plurality, here twelve, of coil portions 12B, each winding/coil 11 being wound around a coil portion 12B and/or a respective coil portion 12B extending through a coil 11.

Optionally, the coil carrier 13 may be provided to support/carry the coils 11, as shown in FIG. 1. However, it is also possible to wind the coils 11 directly around the coil portions 12B.

The coil carrier 13 can be formed in one piece, for example by injection molding onto the stator core 12. Alternatively, the coil carrier 13 can be formed in multiple parts. For example, the coil carrier 13 can consist of two parts which can be inserted/plugged into each other and in which the stator core 12 is/will be enclosed.

The coils 11 can be supplied with power via the connection device 14. Preferably, the connection device 14 has one or more electrical connections 14A and/or a connection carrier 14B, which is preferably formed integrally with the coil carrier 13 or a part of the coil carrier 13.

Figure 3:
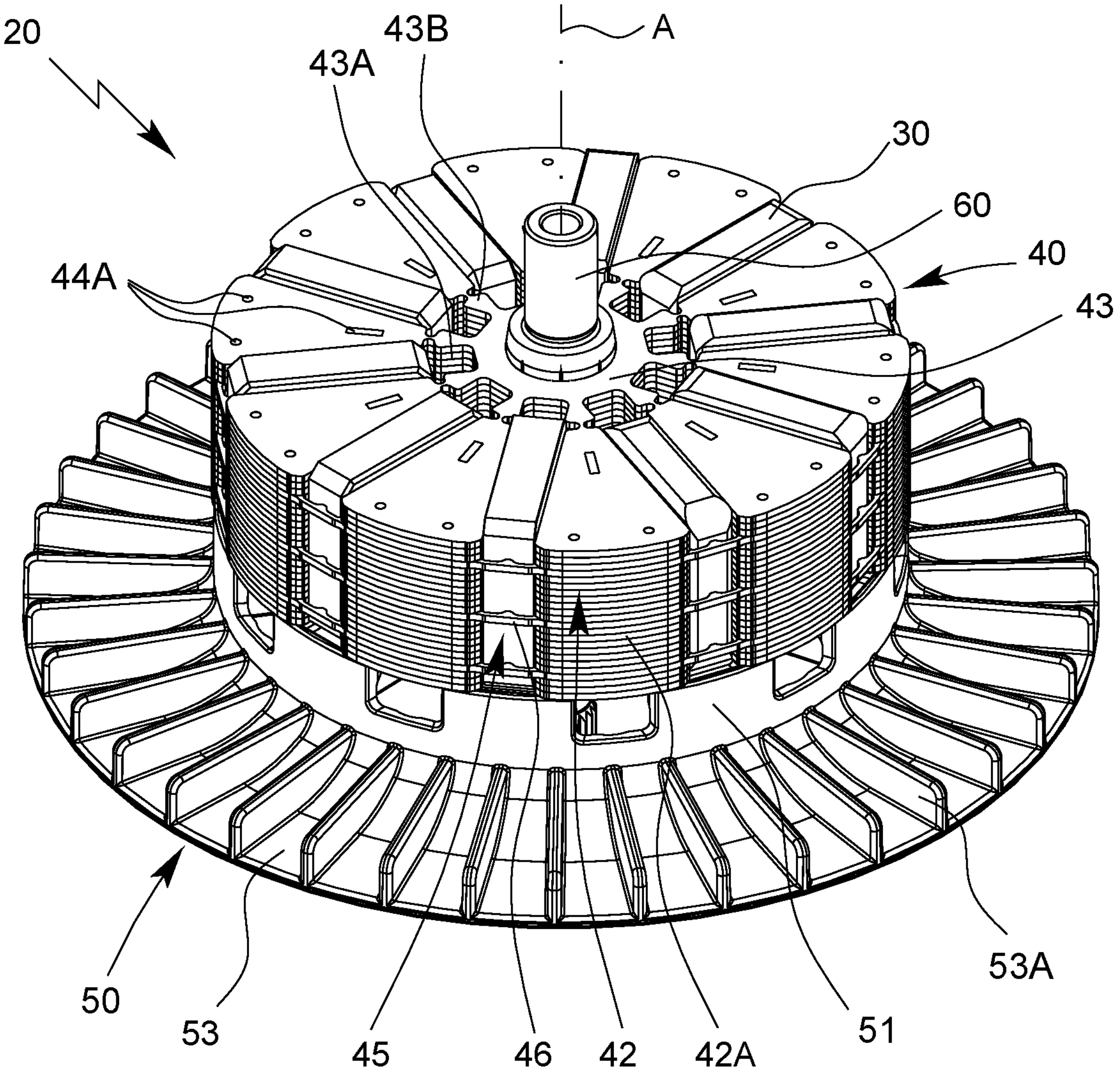
FIG. 3 is a perspective view of the rotor according to FIG. 1.
Figure 4:
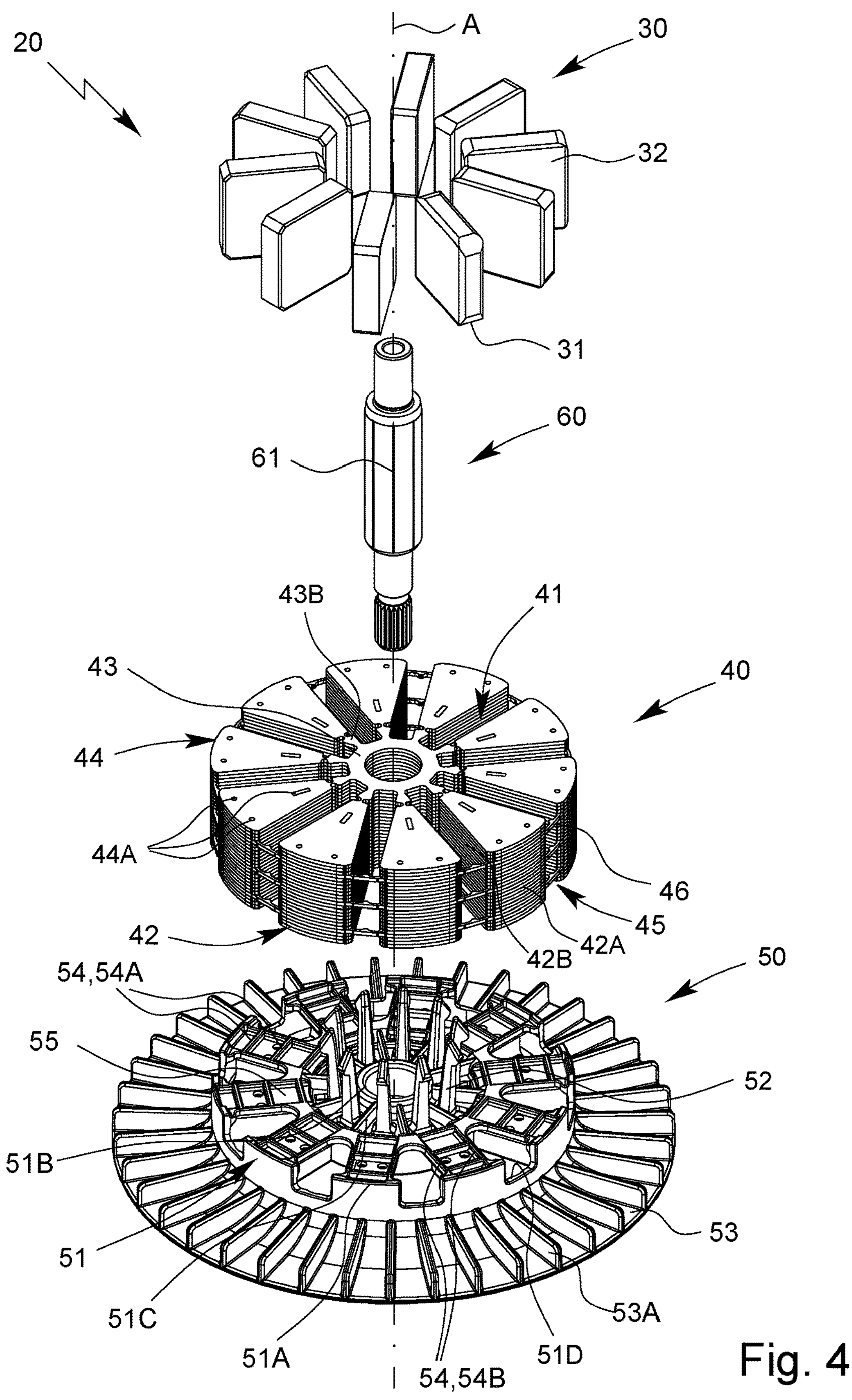
FIG. 4 is an exploded view of the rotor according to FIG. 3.
Figure 5:
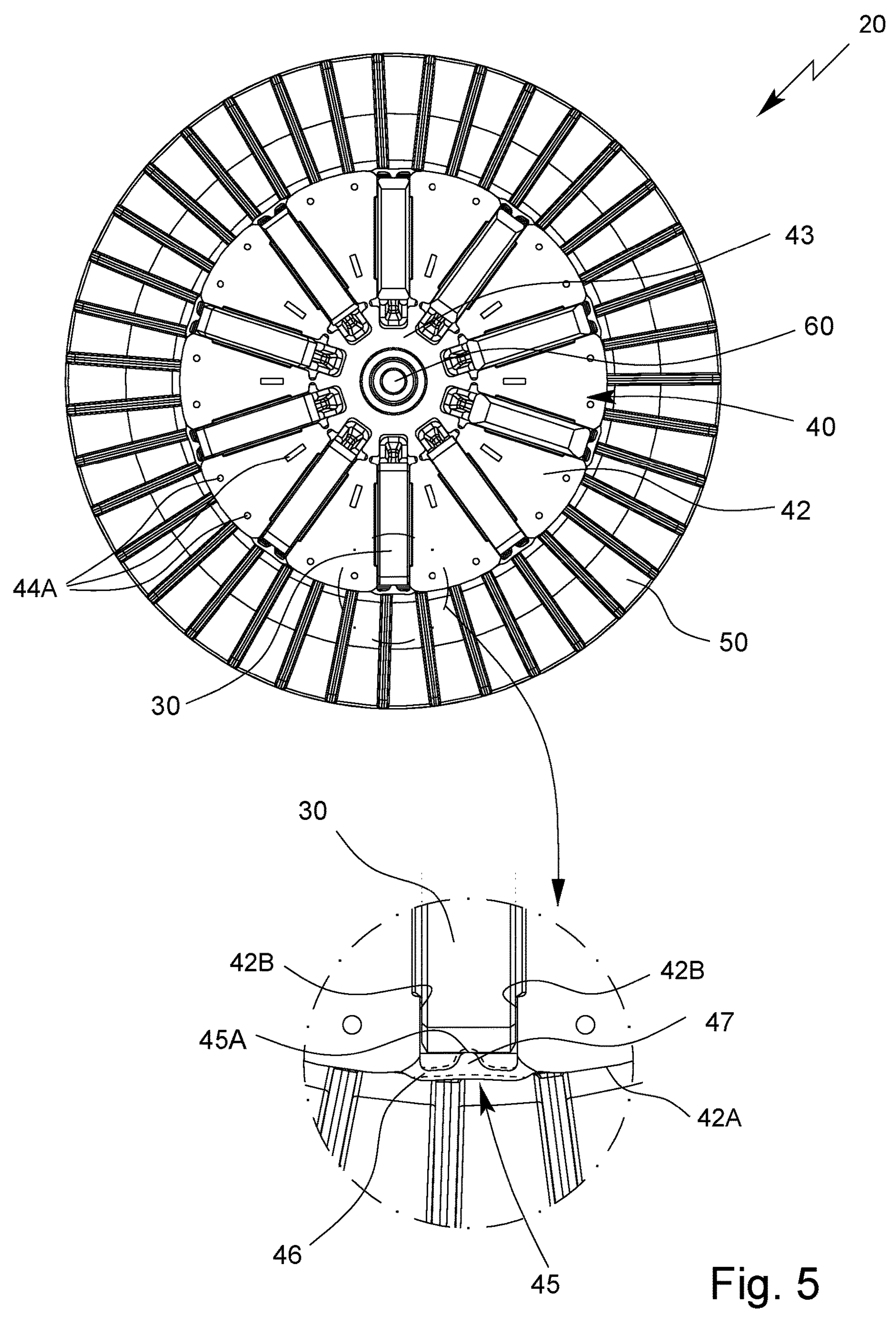
FIG. 5 is a plan view of the rotor according to FIG. 3 with an enlarged detail in the region of a stop.

FIG. 3 shows the rotor 20 according to the proposal in a schematic perspective view corresponding to FIG. 1. FIG. 4 shows the rotor 20 in a schematic exploded view. FIG. 5 shows the rotor 20 in a schematic plan view.

The rotor 20 has a plurality, here ten, of permanent magnets 30, a rotor core 40, a mounting/assembly device 50, and/or a shaft 60.

The permanent magnets 30 are preferably at least substantially cuboidal in shape. The edges of the permanent magnets 30 may be rounded and/or have insertion chamfers/bevels 31, which will be discussed in more detail later in connection with FIG. 7.

Preferably, the permanent magnets 30 are flat and/or each have two opposing flat sides 32.

The flat sides 32 are preferably at least substantially square in shape, but may also be rectangular, depending on the height of the rotor core 40.

The flat sides 32 each preferably have a surface area of more than 4 cm2, in particular of more than 4.5 cm2 and/or of less than 5 cm2.

The longitudinal extent of the permanent magnets 30 and/or the side lengths of the flat sides 32 is/are preferably at least twice or three times, particularly preferably about four times, the respective thickness/width of the permanent magnets 30.

The side lengths of the flat sides 32 are preferably longer than 15 mm, in particular longer than 20 mm, and/or shorter than 30 mm, in particular shorter than 25 mm. Particularly preferably, both side lengths of the flat sides 32 are about 22 mm.

The thickness/width of the permanent magnets 30 is preferably more than 3 mm and/or less than 7 mm each, particularly preferably between 4 and 6.5 mm, in particular about 5.6 mm.

Preferably, the permanent magnets 30 are polarized in the direction of their thickness/width and/or in the direction orthogonal to the flat sides 32 and/or the two flat sides 32 of a permanent magnet 30 form different poles. This is referred to as diametrical magnetization.

The permanent magnets 30 are preferably ferrite magnets and/or the permanent magnets 30 are preferably made of hard ferrite.

It should be noted at this point that the permanent magnets 30 are preferably magnetized only after insertion into the rotor core 40. In this sense, the term “permanent magnets” is preferably to be understood broadly and also includes (at least before and immediately after insertion into the rotor core 40) components that are not yet magnetic but are capable of (permanent) magnetization.

A “permanent magnet” is therefore preferably generally a permanently magnetizable component that can be magnetized or (still) unmagnetized. In this sense, the term “permanent magnet” can also be replaced by the term “permanently magnetizable component” in the preceding and the following description, and/or these terms are to be understood synonymously.

In the following, only the term “permanent magnet” will be used and is preferably to be understood as a component that is magnetized or unmagnetized, unless explicitly mentioned otherwise, but is in any case magnetizable. Thus, both (already) magnetized permanent magnets 30 and (still) unmagnetized permanent magnets 30 are preferably encompassed, unless explicitly described otherwise.

The permanent magnets 30 preferably have (each) a remanence flux density greater than 400 mT, in particular greater than 410 mT, and/or less than 450 mT, in particular less than 420 mT. Particularly preferably, the remanence flux density is between 412.5 mT and 427.5 mT.

The permanent magnets 30 preferably have (each) a coercive field strength of magnetic polarization of at least 200 or 250 kA/m, particularly preferably of at least 300 kA/m or more.

The permanent magnets 30 preferably have (each) a (maximum) energy product of at least 20, 25 or 30 kJ/m3, particularly preferably of at least 32 kJ/m3 or more.

The permanent magnets 30 preferably have (each) a surface tension of at least 20, 25 or 30 mNm, particularly preferably of at least 32 mNm or more.

The permanent magnets 30 are arranged and/or embedded in the rotor core 40. The rotor core 40 has corresponding magnet receptacles 41 for this purpose.

The permanent magnets 30 are preferably arranged in the rotor 20 or rotor core 40 in such a way that they are polarized in the circumferential direction—relative to the shaft 60 and/or rotation axis A—and/or that the surface normals of their flat sides 32 point in the circumferential direction.

The permanent magnets 30 and/or magnet receptacles 41 are preferably arranged in a star shape in the rotor 20 or rotor core 40 and/or arranged around the shaft 60 and/or rotation axis A and/or extend or have a main/longitudinal extension—relative to the shaft 60 and/or rotation axis A—in the radial direction.

The permanent magnets 30 are preferably arranged such that the facing poles and/or flat sides 32 of two adjacent permanent magnets 30 have the same polarity, so that the part and/or sector portion 42 of the rotor core 40 located between the poles and/or flat sides 32 is polarized accordingly and/or forms a corresponding pole of the rotor core 40. In other words, two adjacent permanent magnets 30 are preferably polarized in opposite directions.

In principle, however, the permanent magnets 30 can also be shaped, polarized and/or arranged differently, for example with a longitudinal extension in the circumferential direction or perpendicular/tangential to the radial direction. The magnet receptacles 41 are then shaped/arranged accordingly.

The rotor core 40 is preferably at least essentially annular, (hollow) cylindrical and/or disc-shaped. The rotation axis A preferably forms an axis of symmetry of the rotor core 40. An annular rotor core 40 is also conceivable in particular in an external rotor motor.

The rotor core 40 is fixed/fastened to the shaft 60, in particular connected to the shaft 60 by force-fit, form-fit and/or material-bond.

To fix/fasten the rotor core 40, the shaft 60 may have corrugations and/or protrusions 61. When the rotor core 40 is mounted on the shaft 60, the protrusions 61 dig into the rotor core 40 and thus fix/fasten it to the shaft 60. However, other solutions are also possible here.

The rotor core 40 preferably comprises a plurality, here ten, of sector segments or sector portions 42, wherein a magnet receptacle 41 is formed and/or a permanent magnet 30 is received between each two adjacent sector portions 42. In particular, the magnet receptacles 41 are each bounded/delimited laterally and/or in the circumferential direction by two sector portions 42.

Preferably, the rotor core 40 has an inner portion 43 for receiving the shaft 60, which is annular and/or hollow cylindrical in shape. The sector portions 42 preferably extend from the inner portion 43 in radial direction.

The rotor core 40—also with inserted permanent magnets 30—preferably has one or more openings 43A between the permanent magnets 30 and the shaft 60/rotation axis A, in particular between the permanent magnets 30 and the inner portion 43.

The openings 43A preferably extend in axial direction through the rotor core 40, and/or preferably extend from the top side or a (first) axial end face of the rotor core 40 to the bottom side or the other (second) axial end face of the rotor core 40.

Preferably, the openings 43A are arranged in a ring-like manner around the inner portion 43 and/or the shaft 60 and/or the rotation axis A.

Each opening 43A is preferably bounded/delimited in the radial direction by a respective permanent magnet 30. Preferably, the respective opening 43A adjoins (radially inwardly) the respective magnet receptacle 41 and/or can be regarded as an extension of the respective magnet receptacle 41.

The openings 43A are preferably at least substantially rectangular in cross-section (orthogonal to the shaft 60 and/or the rotation axis A).

With the aid of the openings 43A, the conductivity of the magnets 30 in the rotor core 40 and/or the magnetic flux can be improved/concentrated and/or the magnetic leakage flux can be reduced.

The sector portions 42 are preferably arranged in a star shape on the inner portion 43 and/or around the shaft 60 and/or rotation axis A.

Preferably, the rotor core 40 has connecting portions 43B that respectively connect the sector portions 42 to the inner portion 43 and/or are arranged between the sector portions 42 and the inner portion 43.

The connecting portions 43B preferably extend in a star shape and/or in radial direction and/or from the inner portion 43 to the respective sector portion 42.

The sector portions 42, the inner portion 43 and/or the connecting portions 43B preferably extend in the axial direction over the entire height/extension of the rotor core 40.

The connecting portions 43B are preferably web-shaped and/or form webs between the respective sector portion 42 and inner portion 43.

A connecting portion 43B preferably has (at its thinnest location) a width, i.e. an extension in the circumferential direction and/or an extension transverse to its radial longitudinal extension, of at least 0.3 mm, in particular 0.4 mm, and/or of at most 0.7 mm, in particular at most 0.6 mm. Particularly preferably, each connecting portion 43B (at its thinnest location) has a width of about 0.5 mm.

The thinnest location of the connecting portion 43B is preferably in the region of the connecting portion 43B immediately adjacent to the sector portion 42, and/or where the connecting portion 43B merges with/into the sector portion 42.

The openings 43A are preferably formed between the connecting portions 43B, respectively.

Preferably, the openings 43A are defined/delimited by the inner portion 43, two connecting portions 43B each and one permanent magnet 30 each. In particular, the inner portion 43, one connecting portion 43B and one permanent magnet 30 form each one side of the at least substantially rectangular opening 43A.

The sector portions 42 are preferably each wedge-shaped and/or pie-slice-shaped and/or preferably each have a cross-section (orthogonal to the rotation axis A) in the form of a circular sector and/or at least substantially of a triangle.

The sector portions 42 are preferably cylindrical and/or prism-shaped, in particular with at least substantially circular segment-shaped base surface and/or circular segment-shaped cross-section.

Preferably, each sector portion 42 has an outer side 42A and two inner sides 42B.

The sector portion 42 or the outer side 42A is preferably mirror symmetrical with respect to a plane extending in the axial and radial direction and/or in which the rotation axis A lies and/or which runs along the connecting portion 43B. The inner sides 42B are preferably mirror symmetrical to each other with respect to this plane.

The inner sides 42B each face a magnet receptacle 41 and/or a permanent magnet 30 and/or each delimit a magnet receptacle 41 laterally and/or in the circumferential direction. One/each magnet receptacle 41 is thus preferably bounded/delimited and/or defined respectively by two opposing inner sides 42B of adjacent sector portions 42, in particular laterally and/or in the circumferential direction.

Two opposing inner sides 42B of two adjacent sector portions 42 extend preferably at least substantially parallel to each other. The distance between these inner sides 42B and/or the width of the magnet receptacle 41 formed between them is thus preferably at least substantially constant.

The inner sides 42B are preferably at least substantially planar and/or flat and/or non-curved.

The width of the sector portion 42 preferably means the distance between the two inner sides 42B of the sector portion 42.

Preferably, the width of the sector portion 42 and/or the distance between the two inner sides 42B of a sector portion 42 decreases in the direction towards the rotation axis A, the shaft 60, the inner portion 43 and/or the connecting portion 43B.

Preferably, the width of the sector portion 42 and/or the distance between the two inner sides 42B of a sector portion 42 increases in the direction towards the outer side 42A.

The width of a sector portion 42 and/or the distance between the two inner sides 42B of a sector portion 42 increases preferably substantially continuously and/or linearly in the radial outward direction.

The two inner sides 42B preferably extend from the connecting portion 43B to the outer side 42A, in particular in each case to an outer edge and/or an edge of the outer side 42A facing a magnet receptacle 41.

The inner sides 42B preferably extend approximately in radial direction.

The planes in which the inner sides 42B of a sector portion 42A lie preferably intersect between the rotation axis A or shaft 60 and the sector portion 42 or the associated connecting portion 43A. In other words, the planes intersect in front of the rotation axis A or shaft 60. The planes or inner sides 42B thus in particular do not run (exactly) in radial direction.

The outer side 42A of a sector portion 42 preferably extends between the two inner sides 42B of a sector portion 42 and/or between the two adjacent magnet receptacles 41 and/or permanent magnets 30, in particular at the radially outer end of the inner sides 42B, magnet receptacles 41 and/or permanent magnets 30.

The outer side 42A preferably faces away from the rotation axis A, the shaft 60, the inner portion 43 and/or the connecting portion 43B and/or forms the radially outer side of the sector portion 42.

In particular, the outer sides 42A of the sector portions 42 are arranged radially outwardly and/or on the outer periphery/circumference of the rotor core 40 and/or form the outer surface or shell surface/lateral surface of the rotor core 40.

Preferably, the outer side 42A is curved/bent and/or has a curvature, in particular along its width, i.e. its extension between the inner sides 42B, permanent magnets 30 and/or magnet receptacles 41.

Preferably, the outer side 42A is single-curved and/or curved in only one dimension. In particular, the outer side 42A is not curved along its height, i.e. along its extension in axial direction. I.e., each axially extending (imaginary) line on the outer side is straight or uncurved, whereas lines extending transversely thereto, in particular orthogonally, are curved.

In cross-section, in particular orthogonal to the rotation axis A, the outer contour of the sector portion 42 is preferably arcuate, in particular in the shape of a circular arc.

By the outer contour is preferably meant a line or contour on the outer side 42A that is orthogonal to a line extending axially on the outer side and/or the line or contour of the outer side 42A that is orthogonal to the rotation axis Ain cross-section. In particular, the outer contour runs along the width of the outer side 42A.

An outer side 42A with a circular arc-shaped outer contour preferably also includes an outer side 42A whose outer edges and/or whose edges facing the magnet receptacles 41/permanent magnets 30 are rounded, i.e. which may deviate from the circular arc shape in the region of these edges.

By means of the permanent magnets 30, the sector portions 42 are magnetized and/or polarized, in particular wherein the sector portions 42 form alternating north and south poles.

Preferably, the magnet receptacles 41 are adapted to the shape of the permanent magnets 30 and/or have corresponding sizes or dimensions.

Preferably, the magnet receptacles 41 are slightly wider than the permanent magnets 30, in particular by more than 0.1 mm and/or less than 0.3 mm.

Preferably, the side length of the permanent magnets 30 or, in the installed state, the axial extension of the permanent magnets 30 is greater than the axial extension of the magnet receptacles 41, in particular by more than 0.5 mm or 1 mm and/or less than 4 mm or 3 mm, particularly preferably by about 2 mm.

The permanent magnets 30 thus preferably protrude axially from the rotor core 40 and/or the magnet receptacles 41, particularly preferably only on one side of the rotor core 40, in particular the upper side and/or the side facing away from a mounting device 50 and/or a fan, and/or by the values indicated above.

In the example shown, the magnet receptacles 41 are preferably slot-shaped or trench-shaped and/or form receptacle slots or receptacle trenches and/or extend in the radial direction.

The width of the magnet receptacles 41 and/or the distance between two adjacent sector portions 42 is preferably at least substantially constant.

The permanent magnets 30, magnet receptacles 41 and/or sector portions 42 are preferably evenly distributed around a circular circumference. Adjacent permanent magnets 30 thus preferably enclose an angle of 360° divided by the number of permanent magnets 30. The same applies to the magnet receptacles 41 and/or sector portions 42.

Preferably, the rotor core 40 comprises or is formed from a plurality of stacked electrical sheets or rotor sheets/rotor laminations 44. The rotor sheets 44 are formed and/or stamped accordingly to realize the magnet receptacles 41 and/or sector portions 42 of the rotor core 40.

The shape of an individual rotor sheet 44 preferably corresponds to the previously described shape of the rotor core 40, with the difference that the rotor sheet 44 has only a small axial extension and/or is flat, in particular approximately two-dimensional. The previous and following explanations regarding the shape of the rotor core 40 or parts thereof, for example of the sector portions 42, thus preferably also apply to the rotor sheets 44.

Preferably, the thickness/axial extension of a rotor sheet 44 is at most 1 mm, in particular at most 0.7 mm and/or at least 0.2 mm, in particular at least 0.4 mm. Particularly preferably, the thickness/axial extension of a rotor sheet 44 is about 0.5 mm.

The inner sides and outer side of a sector portion of a rotor sheet 44 are thus preferably approximately line-shaped. However, the same explanations as before preferably apply, in particular with respect to the curvature of the outer side.

The rotor sheets 44 are preferably each formed in one piece, in particular stamped out as one piece from a blank.

The rotor sheets 44 can have connecting areas or punch areas 44A for connecting the individual rotor sheets 44. These are preferably elevations or depressions in the respective rotor sheet 44, which ensure a defined cohesion of the rotor sheets 44. In the illustrative example, each rotor sheet

44 has three punch areas 44A per sector portion 42. The punch areas 44A are preferably point-shaped and/or line-shaped.

Preferably, the rotor sheets 44 are or have been compressed/compacted with a force greater than 30 kN, 40 kN or 50 kN, and/or less than 80 kN or 70 kN, particularly preferably with a force of about 60 kN, to form the rotor core 40.

The rotor core 40 preferably consists of or comprises at least 30, in particular at least 35, and/or preferably at most 50, in particular at most 45 rotor sheets 44. Particularly preferably, the rotor core 40 consists of or comprises about 40 rotor sheets 44.

The number of rotor sheets 44 can be variable. In particular, the thickness of the rotor core 40 can be varied depending on the number of rotor sheets 44 and/or, if the thickness of the rotor core 40 is predetermined, a thickness tolerance in the individual rotor sheets 44 can be compensated.

Particularly preferably, the number of rotor sheets 44 can vary by more than one sheet and/or by less than fifteen sheets, in particular by at most ten sheets. The number of rotor sheets 44 is particularly preferably 40±5 sheets.

The variable rotor sheets 44 are preferably provided on the lower side (side facing the mounting device 50) or the upper side (side facing away from the mounting device 50) of the rotor core 40. In particular, additional rotor sheets 44 are always provided on the same side or existing rotor sheets 44 are always removed on the same side.

The thickness of the rotor core 40 is preferably more than 10 mm, in particular more than 15 mm or 18 mm, and/or less than 30 mm, in particular less than 25 mm or 22 mm. Especially preferably, the thickness of the rotor core 40 is about 20 mm.

The diameter of the rotor core 40 and/or the rotor sheets 44 is preferably larger than 50 mm or 60 mm, in particular larger than 70 mm, and/or smaller than 100 mm or 90 mm, in particular smaller than 80 mm. Particularly preferably, the diameter of the rotor core 40 and/or the rotor sheets 44 is about 77 mm.

In the radial direction, in particular radially inwards and/or on their side facing the shaft 60 and/or rotation axis A, the magnet receptacles 41 are preferably each bounded/delimited by the inner portion 43.

The magnet receptacles 41 each have a (radial) stop 45.

In the radial direction, the magnet receptacles 41 are preferably each bounded/delimited by the stop 45, in particular radially on the outside and/or on their side facing away from the shaft 60 and/or rotation axis A.

The stop 45 can have a continuous stop surface or a plurality of separate stop surfaces 45A. In the example shown, the respective stop 45 is formed by multiple, here three, in particular point-shaped, stop surfaces 45A, as illustrated in particular in FIGS. 3 and 4.

Preferably, the stops 45 or their stop surfaces 45A are formed by the rotor core 40, particularly preferably by one, multiple or all of the rotor sheets 44.

However, solutions are also possible in which the stops 45 or stop surfaces 45A are formed by other and/or separate components which are arranged in the magnet receptacle 41 and/or radially on the outside of the magnet receptacle 41 and/or between two sector portions 42, respectively.

Preferably, the stops 45 and/or the components forming them are connected to the respective sector portions 42 in a force-fit, form-fit and/or material-fit manner.

For example, in an alternative embodiment (not shown), the mounting device 50 could comprise one or more walls extending in the axial direction, which wall(s) form corresponding stops 45 and/or stop surfaces 45A.

In the illustrative example, the stops 45 and/or stop surfaces 45A are preferably formed by individual rotor sheets 44. For this purpose, the rotor core 40 has differently shaped rotor sheets 44, wherein a first shape has or forms stop surfaces 45A, while a second shape has no such stop surfaces.

Preferably, multiple stop surfaces 45A are formed by one rotor sheet 44, in particular (exactly) one stop surface 45A for each magnet receptacle 41.

In the illustrated example, a plurality, here three, of rotor sheets 44 with stop surfaces 45A are provided, between which respectively rotor sheets 44 without stop surfaces are arranged, so that in the axial direction a plurality of, here three, in particular essentially point-shaped, stop surfaces 45A are formed per magnet receptacle 41.

The rotor sheets 44 with stop surface 45A are preferably arranged at approximately the same distance from each other in the rotor core 40. If the number of rotor sheets 44 is variable, the position of the rotor sheets 44 with stop surface 45A in the rotor core 40 preferably remains unchanged.

However, solutions are also possible in which multiple rotor sheets 44 with stop surfaces 45A are stacked directly on top of one another so that these rotor sheets 44 form a continuous and/or axially extending stop surface 45A. In turn, rotor sheets 44 without stop surfaces 45A can then be arranged between such rotor sheet stacks.

It is also possible to form all of the rotor sheets 44 with stop surfaces 45A, so that a continuous stop surface 45A extending over the entire axial extent of the magnet receptacle 41 is formed.

The different rotor sheets 44 are preferably made of the same material, in particular stamped or cut from electrical sheet.

The rotor 20 or rotor core 40 preferably has bars/webs 46 that form or have the stops 45 or stop surfaces 45A.

The webs 46 are each arranged between two sector portions 42 or outer sides 42A thereof, and/or each form a bridge between two sector portions 42 or outer sides 42A.

Preferably, the webs 46 extend in the circumferential direction and/or are arranged radially outwardly and/or on the outer circumference of the rotor core 40.

Particularly preferably, one or more rotor sheets 44 have or form the webs 46. In particular, such a rotor sheet 44 has a closed outer circumference. In contrast, rotor sheets 44 that do not have stop surfaces 45A and/or webs 46 are preferably open at their outer circumference at the regions where the magnet receptacles 41 are formed.

FIG. 5 shows an enlarged detail of one of the webs 46. The other webs 46 are preferably of the same design.

The web 46 preferably has a thickened portion or nose/lug 47, in particular a central one, which forms the stop surface 45A.

The lug 47 preferably extends orthogonally to the main extension direction of the web 46 and/or in radial direction and/or into the magnet receptacle 41. In particular, an at least substantially point-shaped stop surface 45A is realized by the lug 47.

Preferably, the stop 45 and/or web 46 is springy/flexible, in particular to allow tolerance compensation when inserting the permanent magnet 30.

This is achieved in particular by the stop 45 and/or web 46—at least before the permanent magnet 30 is inserted into the magnet receptacle 41—being bent or curved radially inwards (in the direction of the rotation axis A and/or the shaft 60), as indicated by dashed lines in FIG. 5.

When the permanent magnet 30 is inserted, it may press against the stop surface 45A and/or lug 47 and/or the web 46 in such a way that the web 46 bends/yields. However, due to the inward curvature, it can be prevented that the web 46 is pressed too far outwards and/or it can be prevented that the diameter of the rotor core 40 (in the region of the web 46) increases or increases too much.

FIG. 5 shows in the enlarged detail as an example the case where the web 46 is pressed outward with inserted permanent magnet 30, wherein the original position or curvature of the web 46 (before insertion of the permanent magnet 30) is shown as a dashed line. However, depending on the size of the permanent magnet 30 and/or the force acting on it, it is also possible that the web 46 is pressed outwards less or not at all.

Particularly preferably, the rotor core 40 has the same or a smaller diameter in the region of the stops 45 and/or webs 46 than in the region of the sector portions 42, in particular also with the permanent magnet 30 inserted. In other words, the distance or radius between the rotation axis A and the stop 45 or web 46 is smaller than or equal to the (maximum) distance or radius between the rotation axis A and the sector portion outer circumference.

The mounting device 50 is preferably fastened/attached to the shaft 60, in particular by a force fit, a form fit and/or a material fit. Preferably, the fastening is done as with the rotor core 40, for example by means of the protrusions 61 or an interference fit/press fit.

Additionally or alternatively, the mounting device 50 may be fastened/attached to the rotor core 40, in particular in a force-fit, form-fit and/or material-fit manner. For example, the mounting device 50 can be adhesively bonded, heat-staked and/or latched to the rotor core 40 and/or form a snap connection. This will be discussed in more detail later in connection with FIG. 9.

It is also possible for the mounting device 50 to be molded to the rotor core 40 and/or the shaft 60.

The mounting device 50 has a base body 51, a plurality, here ten, of fixing elements 52 and/or a fan portion 53.

Preferably, the mounting device 50, the base body 51 and/or the fan portion 53 are made of plastic and/or formed in one piece, in particular injection molded.

The mounting device 50 and/or the base body 51 are/is preferably disk-like or plate-like and/or at least essentially ring-shaped and/or wheel-shaped and/or rotationally symmetrical. The rotation axis A preferably forms an axis of symmetry of the mounting device 50 and/or the base body 51.

The base body 51 preferably has an outer portion 51A, an inner portion 51B, and/or a connecting portion 51C.

The terms "outer" and "inner" here refer to the position with respect to the rotation axis A and/or shaft 60. The outer portion 51A is therefore at a greater distance from the rotation axis A and/or shaft 60 than the inner portion 51B.

The outer and/or inner portion 51A, 51B are/is preferably at least substantially annular. In particular, the outer portion 51A and the inner portion 51B are arranged concentrically to each other and/or spaced apart (in radial direction).

The inner portion 51B is preferably plugged onto and/or connected to the shaft 60.

The connecting portion 51C connects the outer portion 51A to the inner portion 51C and/or extends between the portions 51A, 51B in the radial direction and/or is formed in a web-like/bar-like and/or spoke-like manner. Preferably, a plurality of connecting portions 51C are formed.

The fan portion 53 is preferably annular and/or extends in a radial direction from the base body 51, in particular the outer portion 51A.

With the fan portion 53, the mounting device 50 is designed as a fan and/or the mounting device 50 can be operated as a fan. For this purpose, the fan portion 53 preferably has corresponding blades, wings or vanes 53A or the like.

The fan portion 53 and/or the mounting device 50 designed as a fan is designed to transport warm air away from the electric motor 1 (into the environment) and/or to supply cool air (from the environment) to the electric motor 1.

As part of the rotor 20, the mounting device 50 and/or the fan portion 53 rotates about the rotation axis A when the electric motor 1 is in operation and can thus convey air accordingly.

The mounting device 50 is preferably arranged axially below or at the bottom of the rotor core 40—at least during the installation or mounting of the permanent magnets 30.

As already mentioned at the beginning, the terms "below", "at the bottom", etc. preferably refer only to the orientation of the electric motor 1 and/or rotor 20 when the permanent magnets 30 are installed, or the orientation shown in the figures. If the electric motor 1 is installed in a machine, this can also be done in a different orientation, in which the mounting device 50 is located above the rotor core 40, for example.

Preferably, the mounting device 50, in particular the base body 51 or its outer portion 51A, limits the magnet receptacles 41 axially and/or (at least during mounting of the permanent magnets 30) from below. Preferably, the mounting device 50, in particular the base body 51 or the outer portion 51A, forms an axial stop or axial abutment or one or more axial contact surfaces for the permanent magnets 30.

On the side opposite the mounting device 50, in particular from above, the magnet receptacle 41 is preferably open. The permanent magnets 30 can therefore be inserted into the magnet receptacle 41 from the side opposite the mounting device 50 and/or from above.

Particularly preferably, the mounting device 50, in particular the base body 51 or its outer portion 51A, has one or more contact elements or stop elements 54 which form the axial stop or axial abutment or axial contact surfaces for the permanent magnets 30.

Preferably, the stop elements 54 are formed by in particular line-like elevations and/or ribs, as shown in particular in FIG. 4. Here, the stop elements 54 preferably run or extend in the circumferential direction or transversely, in particular perpendicularly, to the radial direction and/or in the radial direction. Exemplary in FIG. 4 two stop elements 54A extending transversely and two stop elements 54B extending in radial direction are designated by reference signs.

In the example shown in FIG. 4, a plurality of stop elements 54 are assigned to each permanent magnet 30 and/or each magnet receptacle 41, here three stop elements 54A extending transversely to the radial direction and/or two stop elements 54B extending in the radial direction. However, it is also possible to assign exactly one stop element 54 to each permanent magnet 30 and/or each magnet receptacle 41 or to form one stop element 54 for a plurality of permanent magnets 30 and/or magnet receptacles 41. For example, the mounting device 50 or the base body 51 or the outer portion 51A could have one or more circular stop elements 54 extending across all of the magnet receptacles 41.

Alternatively, the axial stop or axial abutment or axial contact surface can also be formed by a flat area of the mounting device 50, in particular of the base body 51 or its outer portion 51A.

Preferably, the permanent magnets 30 protrude above the rotor core 40 and/or the uppermost rotor sheet 44, as indicated in FIG. 3. In particular, the magnet receptacles 41 are dimensioned accordingly and/or the stop elements 54 are arranged accordingly. Here, the axial extension of the permanent magnets 30 is thus preferably greater than the axial extension of the magnet receptacles 41 and/or the rotor core 40.

Alternatively, the permanent magnets 30 can also be flush with the rotor core 40 and/or the uppermost rotor sheet 44 or extend only to below the uppermost rotor sheet 44. The axial extension of the permanent magnets 30 can therefore also be equal to or smaller than the axial extension of the magnet receptacles 41 and/or the rotor core 40.

Particularly preferably, the mounting device 50, in particular the base body 51 or its outer portion 51A, has or forms reservoirs/receiving chambers 55.

The receiving chambers 55 are provided to receive overdosed adhesive, which will be explained in more detail later in connection with the mounting method for mounting the permanent magnets.

The reservoirs/receiving chambers 55 are preferably tub-shaped, basin-shaped, or trough-shaped, and/or are designed as tubs, basins, or troughs.

The receiving chambers 55 are preferably formed by corresponding (axial) recesses in the mounting device 50 or the base body 51 or the outer portion 51A.

The receiving chambers 55 are preferably arranged (directly) below the permanent magnets 30 and/or magnet receptacles 41.

Preferably, the receiving chambers 55 are laterally bounded/delimited, in particular in the radial direction and/or circumferential direction, by one or more stop elements 54.

In the example shown in FIG. 4, a plurality of receiving chambers 55 are assigned to each permanent magnet 30 and/or magnet receptacle 41. However, it is also possible to assign exactly one receiving chamber 55 to each permanent magnet 30 and/or each magnet receptacle 41 or to form one receiving chamber 55 for a plurality of permanent magnets 30 and/or magnet receptacles 41. In the latter case, the mounting device 50 or the base body 51 or the outer portion 51A could, for example, have one or more circular recesses/receiving chambers 55 extending across all of the magnet receptacles 41.

The receiving chamber(s) 55 associated with a permanent magnet 30 and/or a magnet receptacle 41 preferably has/have a (common) receiving volume of at least 0.25 ml or 0.5 ml, in particular at least 1 ml or 2 ml, and/or of at most 10 ml, in particular at most 5 ml.

The fixing elements 52 are preferably arranged between the outer portion 51A and the inner portion 51B, as shown in particular in FIG. 4. Preferably, the fixing elements 52 are (also) each arranged between two connecting portions 52C. In other words, the outer portion 51A, inner portion 51B and connecting portions 51C each form and/or delimit, in particular circular sector-shaped, regions in each of which a fixing element 52 is arranged.

The fixing elements 52 are preferably evenly/uniformly distributed over a circular circumference.

Preferably, the fixing elements 52 are arranged radially on the inside of the mounting device 50 and/or in the respective magnet receptacles 41 and/or close to the rotation axis A and/or shaft 60.

Preferably, each permanent magnet 30 or each magnet receptacle 41 is assigned (exactly) one fixing element 52 and/or (exactly) one fixing element 52 projects into each magnet receptacle 41. However, solutions are also possible in which a plurality of fixing elements 52 are provided per magnet receptacle 41.

Figure 6:
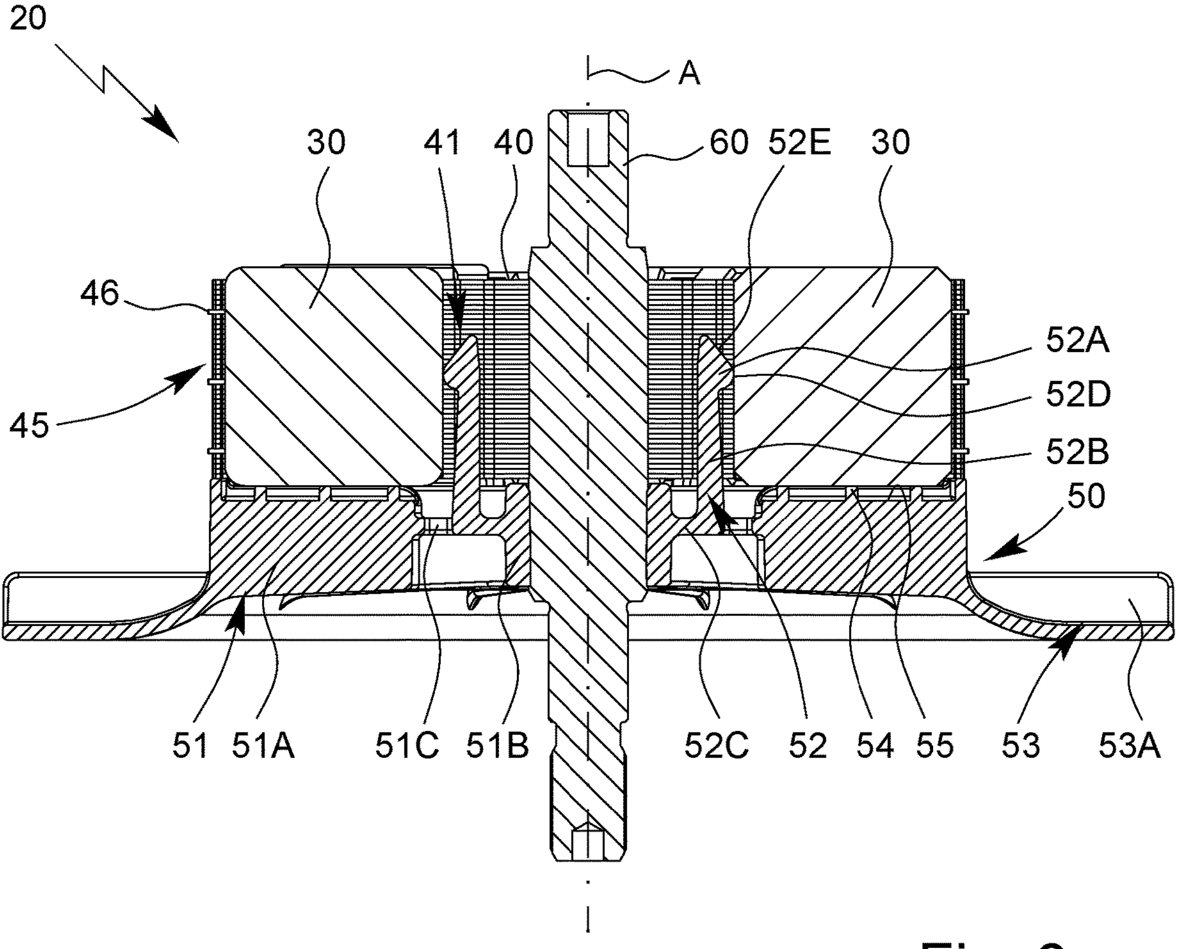
FIG. 6 is a section of the rotor according to FIG. 3 along its rotation axis in the region of a permanent magnet of the rotor.
Figure 7:
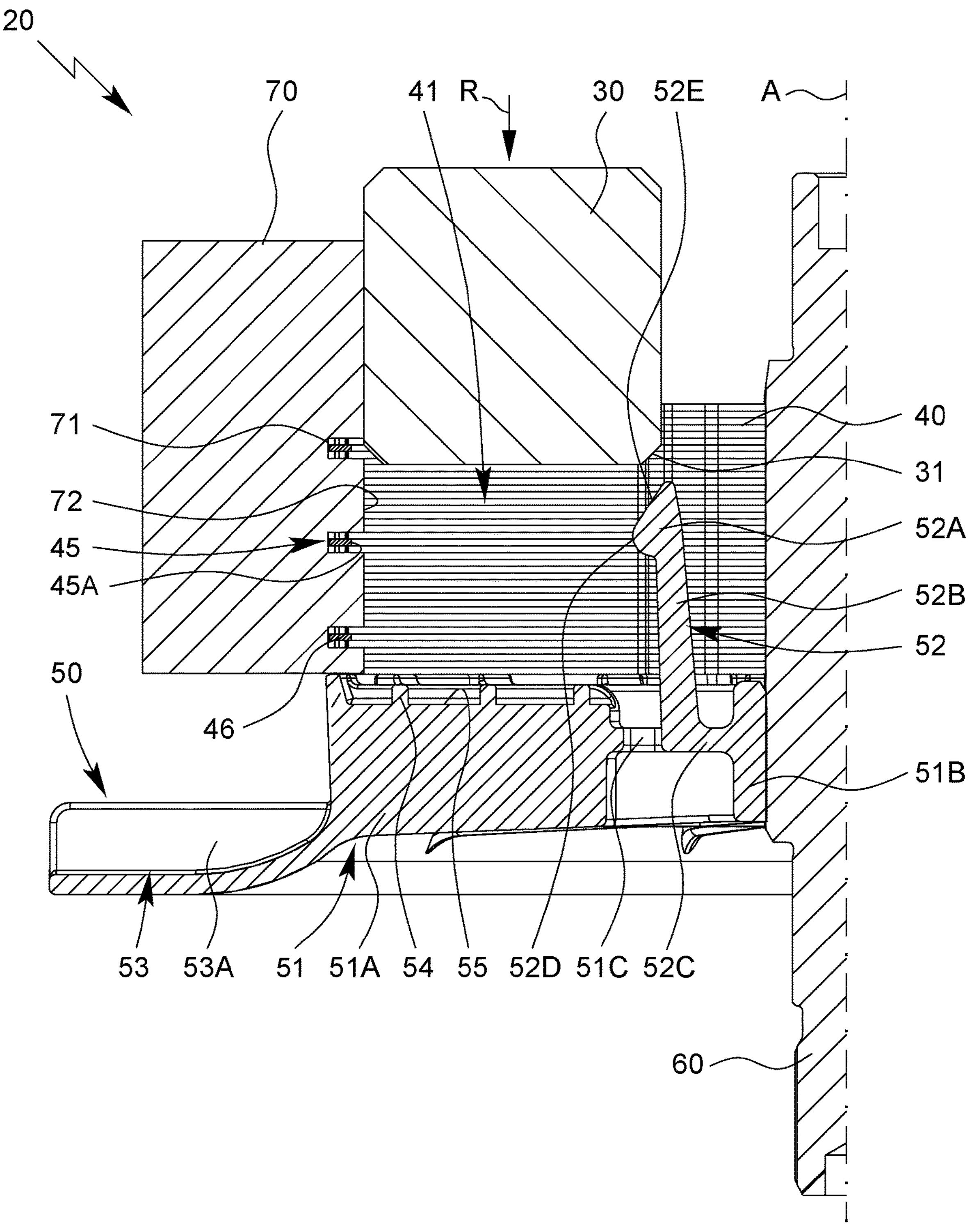
FIG. 7 is a section of the rotor corresponding to FIG. 6 when a permanent magnet is inserted during assembly/mounting.

The structure and function of the fixing elements 52 are explained in more detail with reference to FIGS. 6 and 7. FIG. 6 shows a schematic section of the rotor 20 according to the proposal through two opposing magnet receptacles 41 or permanent magnets 30 or along the rotation axis A. FIG. 7 shows a corresponding sectional view, enlarged in the region of a magnet receptacle 41, before or during insertion of the permanent magnet 30.

In the following, the preferred design/structure and the preferred function are explained in more detail on the basis of one fixing element 52. The explanations preferably apply accordingly to the other fixing elements 52, which are preferably of the same design/structure.

The fixing element 52 is preferably elongated, in particular arm-like.

The fixing element 52 preferably has a free end or head 52A, a connecting arm 52B, and/or a fixed end or joining portion 52C. The connecting arm 52B connects the head 52A and the joining portion 52C to each other and/or connects directly to the head 52A and the joining portion 52C.

The fixing element 52 is connected to and/or integrally formed with the base body 51, in particular with the inner portion 51B and/or via its joining portion 52C.

Particularly preferably, the fixing element 52 is formed integrally with the base body 51. However, other solutions are also possible in which the fixing element 52 is formed as a separate component and is preferably connected to the base body 51 in a form-fit and/or press-fit manner. For example, the fixing element 51 could be inserted/plugged into the base body 51, in particular with its joining portion 52C.

Preferably, the fixing element 52 is formed from an elastic material and/or the same material as the base body 51, in particular plastic, preferably injection molded.

The fixing element 52 is designed to be flexible and/or bendable. In particular, the fixing element 52 can be bent and/or pivoted in the radial direction and/or around its fixed end or joining portion 52C and/or relative to the base body 51.

The fixing element 52, in particular the connecting arm 52B, preferably extends at least substantially in the axial direction and/or projects transversely, in particular at least substantially perpendicularly, from the base body 51.

It should be taken into account that due to its flexibility/bendability, the fixing element 52 or the connecting arm 52B does not have to extend exactly parallel to the rotation axis A and/or shaft 60, but can also enclose a (small) angle with the rotation axis A and/or shaft 60—both before and after mounting the permanent magnet 30.

By "at least substantially in the axial direction" is therefore preferably meant that the fixing element 52 and/or the connecting arm 52B extends more in the axial direction than in the radial direction and/or encloses an angle of less than 450 or 30°, in particular less than 200 or 10°, with the rotation axis A and/or shaft 60.

At least before assembly/mounting, the (main) extension or longitudinal extension of the fixing element 52 or connecting arm 52B—in addition to the axial component—preferably has a radially outwardly directed component, as shown in FIG. 7.

Preferably, the angle between the rotation axis A or shaft 60 and the fixing element 52 or connecting arm 52B before mounting the permanent magnet 30 is at least 3°, in particular at least 5° and/or at most 15°, in particular at most 10°.

Preferably, the angle between the main extension direction of the base body 51 and the fixing element 52 or connecting arm 52B is at most 87°, in particular at most 85° and/or at least 75°, in particular at least 80°, before the permanent magnet 30 is mounted and/or before the mounting device 50 is mounted on the rotor 20.

Particularly preferably, the fixing element 52 or the connecting arm 52B encloses a larger angle with the rotation axis A and/or shaft 60 before the permanent magnet 30 is mounted than in the mounted state of the permanent magnet, as also shown in the figures in FIG. 6 (mounted state) and FIG. 7 (unmounted state).

In the mounted state, the fixing element 52 preferably extends essentially parallel to the rotation axis A, as shown in FIG. 6. Depending on the radial extension of the permanent magnet 30, however, there may still be a deviation from this even in the mounted state.

Preferably, the fixing element 52 is at least substantially L-shaped, wherein the joining portion 52C forms a first leg and the connecting arm 52B, in particular with the head 52A, forms a second leg.

Preferably, the joining portion 52C extends in the radial direction and/or the connecting arm 52B extends at least substantially in the axial direction.

Compared to the connecting arm 52B, the joining portion 52C is preferably short, in particular with a longitudinal extension of less than one third or one quarter of the longitudinal extension of the connecting arm 52B, so that the main extension direction of the fixing element 52 is thus given by the connecting arm 52B.

The main or axial extension of the fixing element 52 is preferably less than the axial extension of the magnet receptacle 41. In other words, the fixing element 52 preferably extends/projects axially into the magnet receptacle 41 but not through the magnet receptacle 41.

Particularly preferably, the main extension/axial extension of the fixing element 52 is at least substantially half the axial extension of the magnet receptacle 41. In particular, the head 52A is arranged at least substantially centrally (in the axial direction) in the magnet receptacle 41.

The fixing element 52, in particular the head 52A, preferably has or forms a contact surface 52D for contact with the permanent magnet 30, in particular on its radially outward-facing side.

The head 52A is preferably rounded, in particular on its radially outer side and/or in the region of the contact surface 52D.

On its upper side and/or the side facing away from the connecting arm 52B, the head 52A preferably has a chamfer/bevel 52E for mounting the permanent magnet 30. This will be discussed in more detail later.

In the mounted state or with the permanent magnet 30 inserted, as shown in FIG. 6, the fixing element 52, in particular its head 52A, presses with the contact surface 52D against the permanent magnet 30, in particular a radially inner end face of the permanent magnet 30, and/or rests/abuts there. Particularly preferably, the contact surface 52D lies at least substantially axially centrally against the permanent magnet 30.

The fixing element 52 is preferably biased against the permanent magnet 30 and/or exerts a radially outward force on the permanent magnet 30.

The fixing element 52 preferably presses radially outward on the permanent magnet 30 and/or presses the permanent magnet 30 against the stop 45 and/or the stop surface(s) 45A.

In particular, the permanent magnet 30 is fixed or clamped between the stop 45 or stop surface(s) 45A and the fixing element 52 or its head 52A or the stop surface 52D.

Solutions are also possible in which the fixing element 52 forms an (axial) form fit and/or an (axial) latching or snap connection with the permanent magnet 30 and/or in which the head 52A is designed as a snap lug/latching lug.

For this purpose, the fixing element 52, in particular with the head 52A, can engage in a corresponding recess of the permanent magnet 30 or the like.

Alternatively, it is also possible that the fixing element 52 engages around or over the permanent magnet 30 (on the magnet top side or the side facing away from the mounting device 50) with the head 52A in order to form a form-fit or latching or snap connection and/or to secure the permanent magnet 30 axially. In this case, the fixing element 52 projects in particular through the magnet receptacle 41.

The mounting device 50 can preferably be held on the rotor core 40 via the clamping and/or latching of the fixing elements 52—in addition to or as an alternative to other fastenings/fastening options.

In the following, a preferred method for mounting and/or inserting a permanent magnet 30 into the rotor 20 or rotor core 40 is explained in more detail with reference to FIG. 7. Preferably, the other permanent magnets 30 are or have been mounted in the same way, so that the explanations apply accordingly.

As already mentioned at the beginning, the permanent magnet 30 is preferably still unmagnetized or to be understood as an unmagnetized, permanently magnetizable component during mounting/insertion. However, it is also possible that an already magnetized, permanently magnetizable component or a magnetized permanent magnet 30 is inserted or mounted.

When or before the permanent magnet 30 is mounted, the rotor core 40 and the mounting device 50 are preferably already attached/fixed to each other and/or to the shaft 60.

The magnet receptacle 41 is preferably bounded/delimited and/or defined laterally or in the circumferential direction by respectively two adjacent sector portions 42 or their inner sides 42B, radially on the outside by the stop 45, radially on the inside by the inner portion 43 and/or axially, in particular on the bottom side or from below, by the mounting device 50, in particular the stop element(s) 54. On the side opposite the mounting device 50, in particular from above, the magnet receptacle 41 is preferably open.

Optionally, a guide device 70, in particular a guide rail, can be used during mounting to guide the permanent magnet 30 during insertion into the magnet receptacle 41, in particular to prevent tilting/canting of the permanent magnet 30. However, as required, the guide device 70 can also be omitted, for example if the stop 45 has a continuous, axially extending surface and/or forms a guide for the permanent magnet 30.

Preferably, the guide device 70 is moved radially from the outside to the magnet receptacle 41 and/or is arranged from radially outside at the magnet receptacle 41. For this purpose, the guide device 70 has, in particular, recesses 71 for the webs 46. Because of the recesses 71, the guide device 70 can project (radially) into the magnet receptacle 41 between the webs 46.

However, solutions are also possible in which the guide device 70 is inserted axially from the open side of the magnet receptacle 41 or from above into the magnet receptacle 41 or is designed for this purpose.

The guide device 70 preferably has an axially extending guide surface or guide edge 72 along which the permanent magnet 30 can be guided.

Particularly preferably, the guide edge 72 and the stop surface(s) 45A of the stop 45 are spaced from each other in such a way that the guide edge 72 is located radially further inwards than the stop surface(s) 45A. For this purpose, the recesses 71 can be dimensioned accordingly. In the design with the guide device 70 inserted from above, the guide device 70 preferably has a corresponding thickness (in the radial direction).

Particularly preferably, before inserting the permanent magnet 30, adhesive is deposited or applied to the magnet receptacle 41 and/or to the lateral boundaries of the magnet receptacle 41, in particular to the two corresponding sector portions 42, in particular on the upper or open side. In principle, however—as already described above—solutions are also possible in which adhesive can be dispensed with. In this case, the adhesive application step is omitted.

The permanent magnet 30 is inserted or introduced axially into the magnet receptacle 41 from the open side of the magnet receptacle 41 or from above, as illustrated with an arrow R in FIG. 7.

During insertion, the permanent magnet 30 is preferably guided along the guide edge 72. Due to the spacing of stop 45/stop surface(s) 45A and guide edge 72, the permanent magnet 30 is also (radially) spaced from the stop 45/stop surface(s) 45A. Particularly if no guide device 70 is used and/or the stop 45 forms the guide, however, the permanent magnet 30 can also already lie against and/or be guided by the stop surface 45A during insertion.

When the permanent magnet 30 has been partially, in particular approximately halfway, inserted into the magnet receptacle 41, the permanent magnet 30 preferably encounters the fixing element 52, in particular the head 52A, or a contact occurs between the permanent magnet 30 and the fixing element 52 or head 52A, in particular between the insertion chamfer 31 of the permanent magnet 30 and the chamfer 52E of the fixing element 52. It is also possible to provide only one chamfer either on the permanent magnet 30 or on the fixing element 52 and to dispense with a corresponding counter chamfer.

During further insertion, the permanent magnet 30 preferably presses or braces or deforms or bends the fixing element 52 inward in the radial direction, in particular until the permanent magnet 30 has slid off the chamfer 52E and/or the contact surface 52D comes into contact with the permanent magnet 30. The fixing element 52 is then preferably clamped/tensioned/biased (in radial direction) against the permanent magnet 30.

The bracing and/or bending/deforming of the fixing element 52 is favored in particular by the chamfer(s) 31, 52E and/or in that the extension of the fixing element 52, at least before the bracing/bending/deforming, having also a radially outwardly directed component, as described previously.

The permanent magnet 30 is then pushed further in the axial direction or insertion direction R into the magnet receptacle 41 until it is completely inserted into the magnet receptacle 41 and/or is axially aligned/positioned. In particular, the permanent magnet 30 is pushed/inserted into the magnet receptacle 41 in the axial direction or insertion direction R until it axially abuts or comes to rest against the mounting device 50 or the base body 51, in particular the stop element(s) 54.

As mentioned above, solutions are also possible in which the fixing element 52 (additionally) latches with the permanent magnet, in particular by the head 52A engaging in a recess of the permanent magnet 30 or engaging over the permanent magnet 30 on its upper side or side facing away from the mounting device 50. In this case, the engagement preferably occurs as soon as the permanent magnet 30 is fully inserted or abuts axially. The head 52A is arranged in particular in a corresponding axial position or height in or above the magnet receptacle 41.

If adhesive is used, the permanent magnet 30 preferably drags it along or down when it is inserted into the magnet receptacle 41, so that gaps between the permanent magnet 30 and the magnet receptacle 41, in particular the rotor core 40 or sector portions 42, fill with adhesive.

Overdosed adhesive preferably collects in the receiving chamber(s) 55 and/or is carried in there. Particularly preferably, the overdosed adhesive in the receiving chamber(s) 55 additionally bonds the permanent magnet 30 to the mounting device 50.

The fixing element 52, which is clamped/tensioned/biased against the permanent magnet 30, exerts a radially outward force on the permanent magnet 30.

If no guide device 70 is used, the permanent magnet 30 is also already positioned/aligned in the radial direction after the axial aligning/positioning and is held and/or (pre-)fixed in this position by the fixing element 52. In particular, the fixing element 52 presses the permanent magnet 30 against the stop 45 so that the permanent magnet 30 is clamped between the fixing element 52 and the stop 45.

If the guide device 70 is used, it is removed after the axial positioning/aligning—if adhesive is used, before it has cured.

Due to the preferred spacing of guide edge 72 and stop 45/stop surface(s) 45A, the permanent magnet 30 is initially only in contact with guide edge 72, but not with stop 45 or stop surface(s) 45A (radially). If the guide device 70 is now removed, there is therefore a (temporary) gap between the permanent magnet 30 and the stop 45. However, this gap is closed immediately after removal of the guide device 70 due to the pretension of the fixing element 52.

Immediately after removal of the guide device 70, the fixing element 52, which is clamped/tensioned/biased against the permanent magnet 30, presses or pushes the permanent magnet 30 radially outward until the permanent magnet 30 abuts the stop 45 or the stop surface(s) 45A. In this way, the permanent magnet 30 is positioned in the radial direction by the fixing element 52.

During this positioning, the fixing element 52 partially relaxes. Preferably, however, the remaining pretension/preload is large enough to hold or clamp or fix the permanent magnet 30 in position, in particular—if adhesive is used—to prefix the permanent magnet 30 until the adhesive has cured.

If necessary, however, an additional device (not shown) can also be used which is inserted or clamped between the fixing element 52 and the inner portion 43 in order to exert an additional radially outward force on the permanent magnet 30. For this purpose, the fixing element 52 is preferably chamfered on its radially inner side and/or the side opposite the stop surface 52D, as also indicated in FIGS. 6 and 7. Such a device is preferably removed again after the adhesive has cured.

After the permanent magnet 30 has been mounted and/or the adhesive has cured, the mounting device 50 preferably remains on the rotor 20 and/or forms part of the rotor 20 or electric motor 1 in operation.

Preferably, the permanent magnets 30 are magnetized only in the rotor 20 and/or only after mounting and/or after or during curing of the adhesive. In this sense, during the mounting method, preferably not yet magnetized permanent magnets 30 or permanently magnetizable components are used as described, in particular inserted and/or adhesively bonded into the magnet receptacles 41. However, it is also possible to use already magnetized permanent magnets 30 during mounting.

The method according to the proposal enables a simple, fast, reliable, cost-effective and/or safe mounting of the permanent magnet(s) 30. In particular, a simple, safe and reliable positioning and/or (pre-)fixing of the permanent magnet(s) on the rotor or rotor core can be ensured.

Individual method steps of the method can, where appropriate, also be carried out in a different sequence/order and/or omitted.

In the following, further embodiments of the proposed rotor 20, which can also be used accordingly for the proposed electric motor 1, are explained with reference to FIGS. 8 to 11, wherein primarily only essential differences and/or new aspects are discussed.

The previous explanations and remarks apply in particular accordingly or supplementarily, even without repetition.

Figure 8:
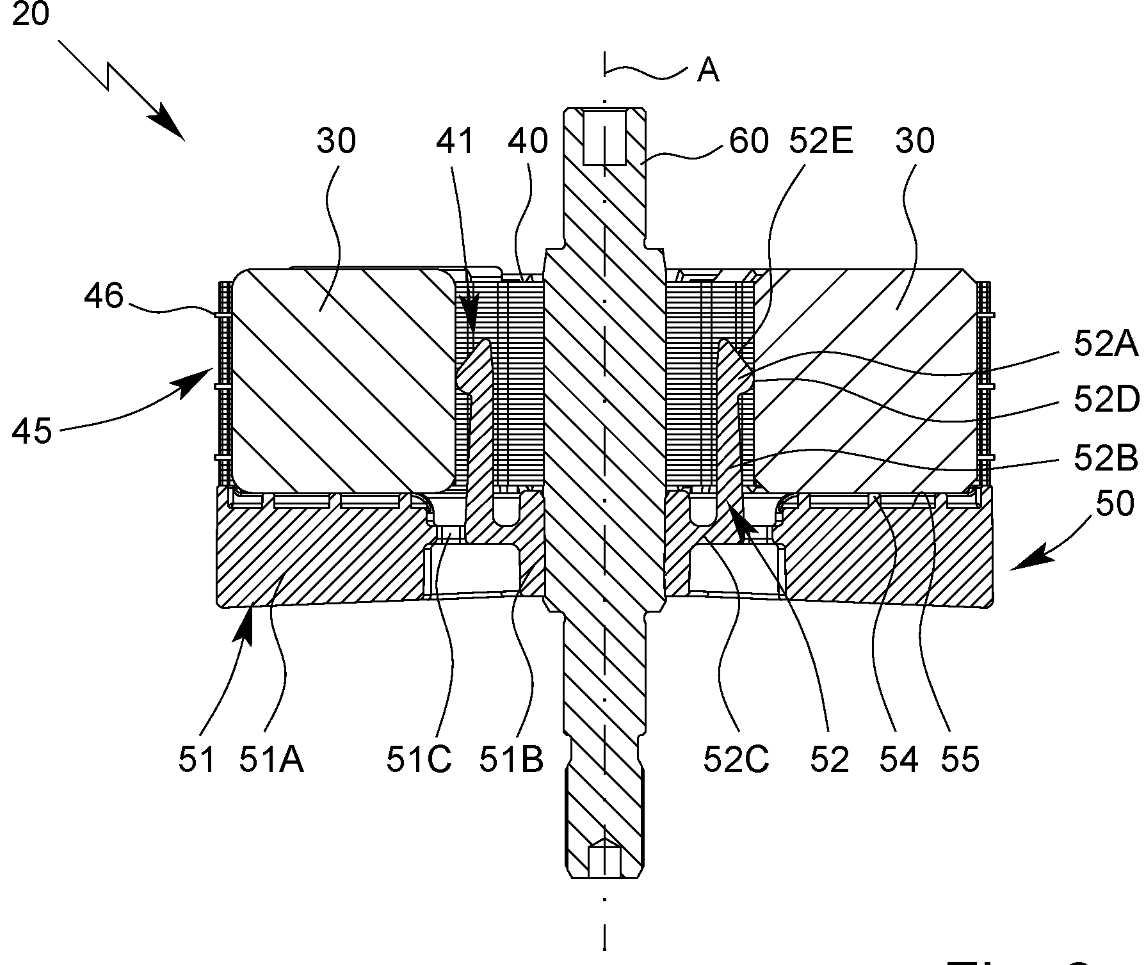
FIG. 8 is a section of the proposed rotor according to a second embodiment, the sectional view corresponding to FIG. 6.

As previously described and shown in FIGS. 1 to 7, the mounting device 50 is preferably designed as a fan and/or has the fan portion 53. However, it is also possible to design the mounting device 50 without fan function and/or without fan portion 53. FIG. 8 shows the rotor 20 in a second embodiment with such a mounting device 50 in a section corresponding to FIG. 6.

The second embodiment preferably differs from the first embodiment only in that no fan portion 53 is provided on the mounting device 50. In all other respects, the rotor 20 or the mounting device 50 is preferably designed as in the first embodiment and has, in particular, the fixing elements 52 and/or receiving chambers 55. The previous explanations therefore apply accordingly.

Preferably, the mounting device 50 of the second embodiment also remains on the rotor 20 or is fixed to the rotor 20 as described for the first embodiment. Alternatively, however, it is also possible for the mounting device 50 to be used only for positioning and/or pre-fixing the permanent magnets 30 and then removed again—in particular after the adhesive has cured.

According to a further, not shown embodiment, it is also possible to reduce the mounting device 50 even further and to form the base body 51 only with the inner portion 53B and the fixing elements 52. In particular, the mounting device 50 then forms no axial boundary of the magnet receptacles 41 and no receiving chambers 55. In such an embodiment, the mounting device 50 is thus formed as a ring which can be fitted/plugged onto the shaft 60 and from which the fixing elements 52 project axially. As required, such a mounting device 50 could remain on the rotor 20—for example if the permanent magnets 30 are fixed only by means of clamping and/or without adhesive bonding—or be removed again after mounting and/or adhesive bonding.

Figure 9:
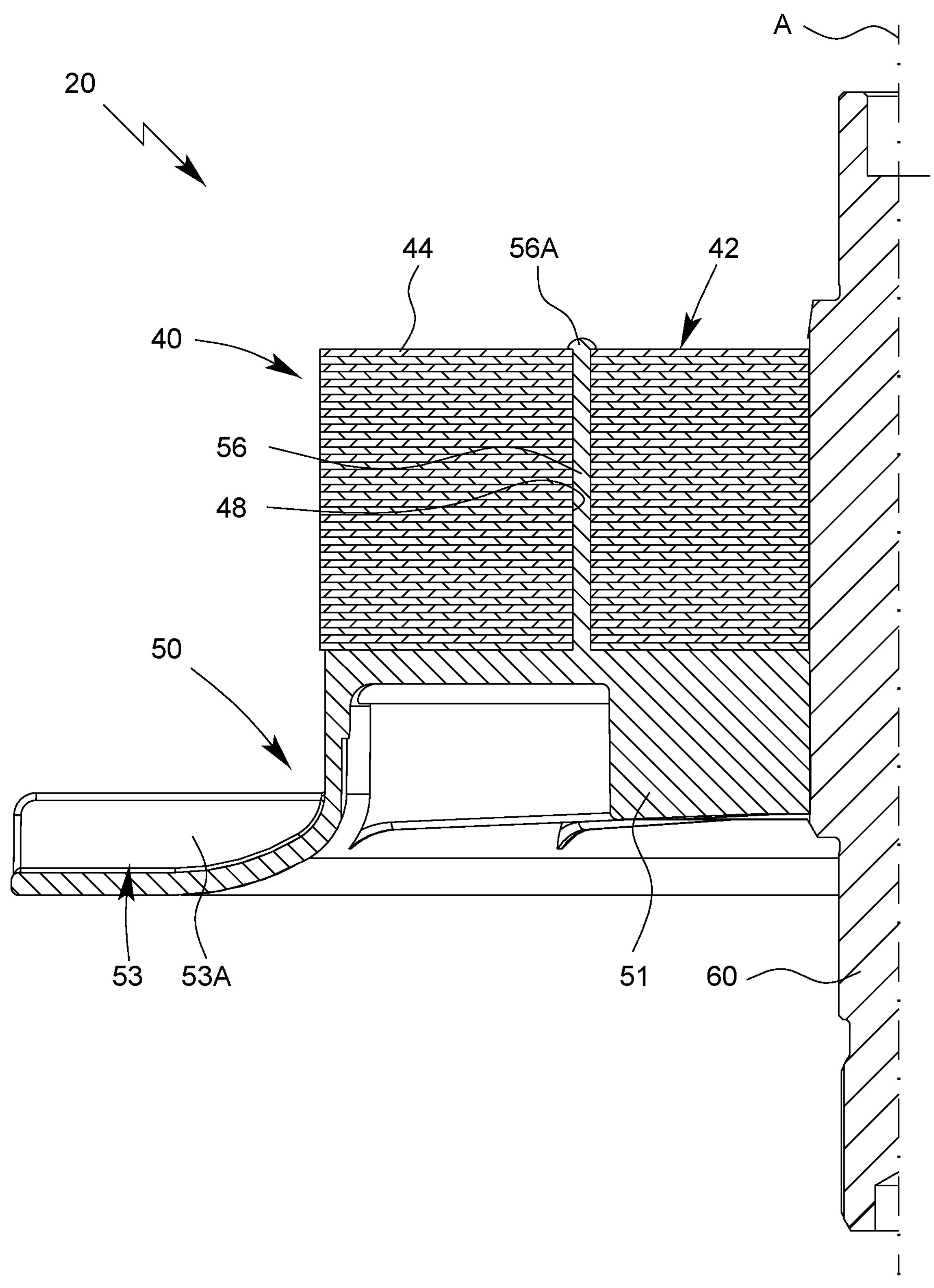
FIG. 9 is a section of the proposed rotor according to a third embodiment along its rotation axis in the region of a portion of the rotor core.

As already mentioned in connection with the first embodiment, the mounting device 50 can also—in addition or as an alternative to being attached/fastened to the shaft 60—be connected (directly) to the rotor core 40 in a force-fitting, form-fitting and/or material-fitting manner. FIG. 9 shows an example of the rotor 20 according to a third embodiment with such an attachment/fastening. FIG. 9 shows a section along the rotation axis A through a sector portion 42 of the rotor core 40.

For fastening/attaching the mounting device 50 to the rotor core 40, the mounting device 50 according to the third embodiment preferably comprises one or more fastening elements 56.

The fastening elements 56 are preferably integral with the base body 51 and/or formed from the same material, in particular plastic, preferably injection molded.

Preferably, the fastening elements 56 are pin-like and/or project or extend, in particular from the base body 51, in the axial direction.

Preferably, the fastening elements 56 project into the rotor core 40, in particular its sector portions 42, or engage therein. Particularly preferably, the fastening elements 56 each extend (completely) through the rotor core 40 or the respective sector portions 42.

Here, a plurality of fastening elements 56 or only one fastening element 56 can be provided for each sector portion 42. It is also possible that fewer fastening elements 56 are provided than sector portions 42, so that, for example, only one fastening element 56 is provided for every second sector portion 42 (in the example with ten sector portions 42, therefore, only five fastening elements 56).

The fastening elements 56 are preferably evenly/uniformly distributed over a circular circumference, in particular to avoid imbalances.

The rotor core 40 and/or the sector portions 42 preferably have corresponding apertures 48, in each of which a fastening element 56 engages or projects (through). The apertures 48 preferably extend correspondingly in the axial direction. In particular, each rotor sheet 44 has corresponding holes so that the rotor sheets 44 stacked one on top of the other with the holes form the respective aperture 48.

Due to the engagement of the fastening elements 56 in the rotor core 40, in particular the sector portions 42 or apertures 48, the mounting device 50 is preferably connected to the rotor core 40 in a force-fit, form-fit and/or material-fit manner.

Particularly preferably, the fastening elements 56 each have a head 56A at their free end or the end facing away from the base body 51. The head 56A is preferably arranged on the upper side of the rotor core 40 or sector portion 42 or the uppermost rotor sheet 44.

The head 56A preferably has a larger diameter than the aperture 48 and/or the remaining portion of the fastening element 56.

Particularly preferably, the fastening element 56 or the head 56A is heat-staked to the rotor core 40. In this case, it is not necessary to form the head 56A prior to mounting/assembly. Instead, after the fastening element 56 has been passed through the aperture 48, the head 56A can be created by means of heat staking.

Alternatively or additionally, however, it is also possible to make the head 56A flexible so that it can be pushed through the aperture 48 during mounting/assembly. Where appropriate, heat staking can then be dispensed with.

The head 56A preferably forms a positive fit/form fit with the rotor core 40. In this way, a form-fit/positive connection is preferably achieved between the mounting device 50 and the rotor core 40. In the case of heat staking, a material-fit connection can also be formed.

Alternatively or additionally, an interference fit or other connection may be provided between fastening element 56 and aperture 48.

As already mentioned at the beginning, the rotor core 40 and the mounting device 50 can also be connected to each other in other ways, for example by means of a snap-on connection. The fastening elements 56 are then designed accordingly, for example as snap hooks or the like.

Alternatively or additionally, an attachment of the mounting device 50 can also take place via the clamping of the fixing elements 52 to the permanent magnets 30—and thus indirectly to the rotor core 40—as already explained.

In the example shown in FIG. 9, the mounting device 50 has the fan portion 53. However, it is of course also possible to design the mounting device 50 according to the third embodiment without fan portion 53.

Preferably, the explanations regarding the first and second embodiment apply accordingly to the third embodiment. In particular, the mounting device 50 according to the third embodiment also has the fixing elements 52 and/or receiving chambers 55. However, the attachment of the rotor core 40 and the mounting device 50 according to the third embodiment can in principle also be realized independently of the fixing elements 52 and/or receiving chambers 55 or other features of the first and/or second embodiment.

Figure 10:
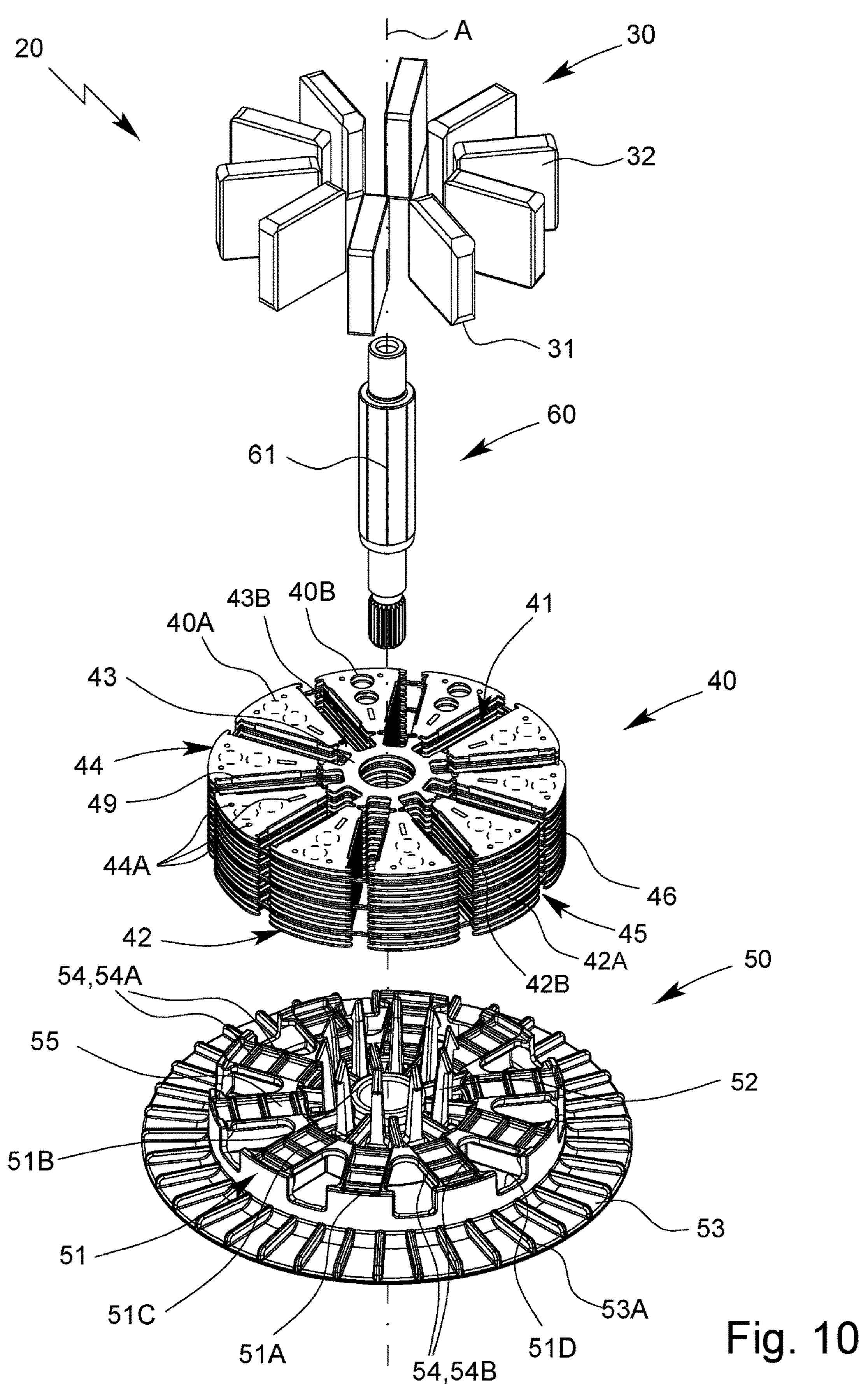
FIG. 10 is an exploded view of a rotor according to a fourth embodiment.
Figure 11:
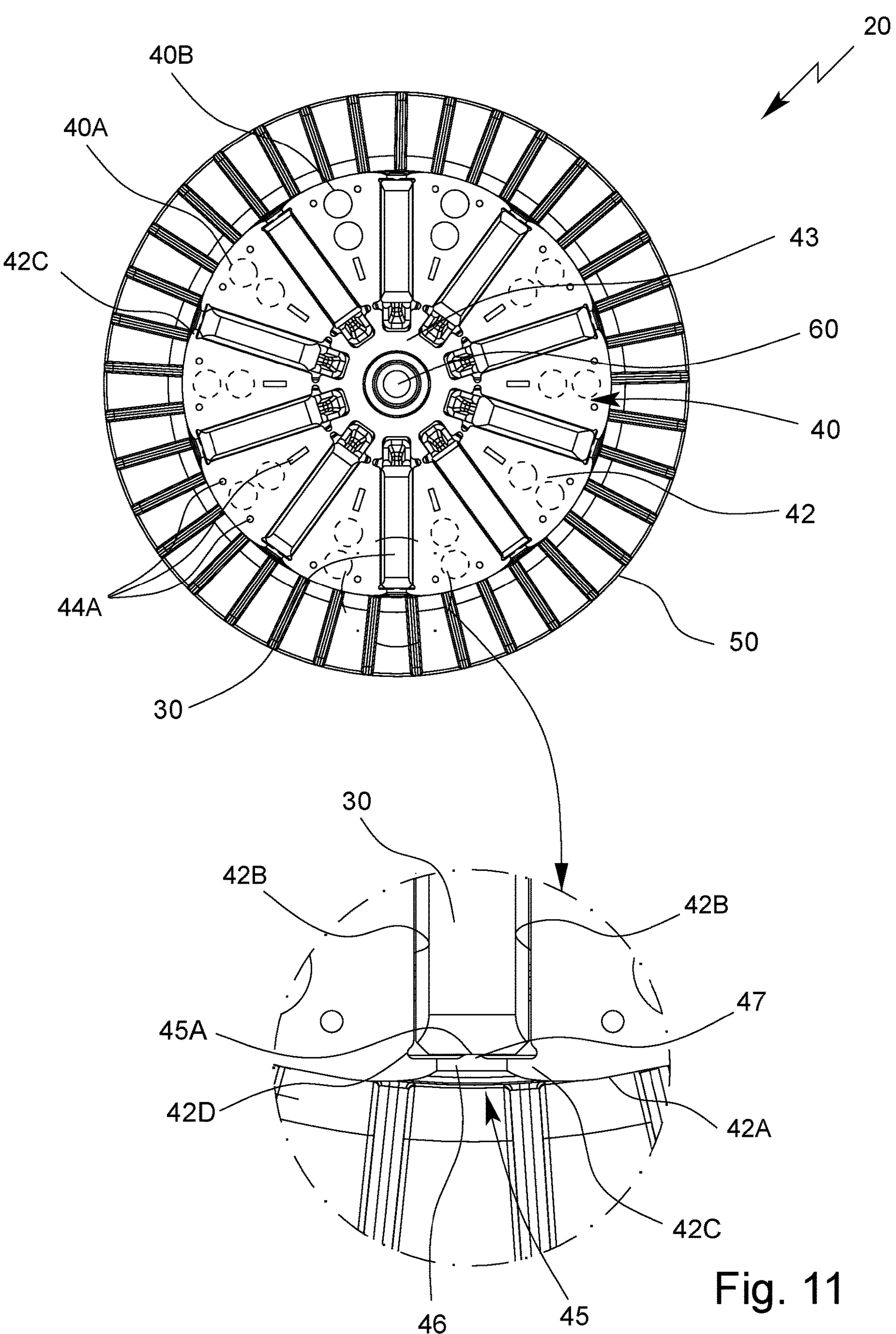
FIG. 11 is a plan view of the rotor according to the fourth embodiment with an enlarged detail in the region of a stop.

FIGS. 10 and 11 show a preferred fourth embodiment of the rotor 20. Here, FIG. 10 shows the rotor 20 in a schematic exploded view and FIG. 11 in a schematic plan view, wherein a part of the rotor 20 is additionally shown in an enlarged detail. The view of the rotor 20 according to the fourth embodiment in FIGS. 10 and 11 corresponds here to the view of the rotor 20 according to the first embodiment in FIGS. 4 and 5.

Again, primarily only the essential differences and/or new aspects will be addressed. In particular, the explanations and remarks on the previous embodiments also apply accordingly or supplementarily to the fourth embodiment, even without repetition.

The electric motor 1 or rotor 2 of the fourth embodiment differs from the previous embodiments preferably essentially in the design and/or shape of its rotor core 40, in particular of the sector portions 42, and/or of the individual rotor sheets 44.

In the fourth embodiment, the sector portions 42 have projections/extensions 42C extending in the circumferential direction, in particular on their outer circumference or outer side 42A, as can be seen in particular from the enlarged detail of FIG. 11.

Each sector portion 42 preferably has two extensions 42C and/or is at least substantially anchor-shaped.

Preferably, the rotor core 40 or the respective sector portion 42 has one extension 42C per inner side 42B and/or (exactly) one extension 42C is assigned to each inner side 42B.

The respective extension 42C preferably extends and/or projects transversely, in particular perpendicularly, from the respective inner side 42B, in particular at the radially outer end thereof.

The extensions 42C preferably extend in prolongation of the respective outer side 42A and/or form a part of the outer side 42A, in particular the outer region of the outer side 42A in the circumferential direction or direction of the magnet receptacles 41.

In the base surface and/or cross-section of the respective sector portion 42, the extensions 42C preferably extend beyond the respective (arcuate) outer contour of the sector portion 42 and/or along an extended outer contour.

The extent/length of the extensions 42C in the circumferential direction and/or in the direction towards the respective magnet receptacle 41 is preferably greater than 0.5 mm, in particular greater than 1 mm and/or less than 2 mm, in particular less than 1.5 mm.

Preferably, the extensions 42C project into the respective magnet receptacle 41 and/or the extensions 42C delimit the respective magnet receptacles 41 at least partially in radial direction.

Two opposing extensions 42C of two adjacent sector portions 42 are preferably spaced apart.

The distance between two opposing extensions 42C of two adjacent sector portions 42 is preferably more than 2 mm, in particular more than 3 mm and/or less than 5 mm, in particular less than 4 mm, particularly preferably about 3.5 mm.

The extensions 42C preferably extend continuously in the axial direction. In particular, the extensions 42C are formed by all rotor sheets 44, and/or each rotor sheet 44 has corresponding extensions or formations for forming the extensions 42C.

The extensions 42C can form the respective radial stops 45 and/or stop surfaces 45A. Corresponding webs 46 can then be dispensed with.

However, it is preferred to provide the webs 46 with the lugs 47 also in the fourth embodiment and/or to form the radial stops 45 and/or stop surfaces 45A by the webs 46 and/or their lugs 47.

The webs 46 preferably increase the stability of the rotor core 40.

In the fourth embodiment, the webs 46 are preferably each formed between two opposing extensions 42C of adjacent sector portions 42. In particular, two respective opposing extensions 42C of adjacent sector portions 42 are connected to each other via one or more webs 46, in the illustrative example via three webs 46.

As in the first embodiment, the webs 46 are preferably formed by individual rotor sheets 44 that are formed differently from the other rotor sheets 44. The rotor sheets 44 that form or have the webs 46 preferably also have corresponding formations/extensions to form the extensions 42C, but additionally have the respective web 46 between these formations, in particular integrally with the formations for forming the extensions 42C.

In the example shown, the rotor core 40 preferably has three rotor sheets 44 with webs 46 and/or three webs 46 per magnet receptacle 41 and/or permanent magnet 30. However, it is also possible to provide more or fewer webs 46, in particular depending on the height of the rotor core 40. It is also possible, as already described for the first embodiment, for a web 46 to be formed by a plurality of rotor sheets 44 lying directly one above the other.

The longitudinal extent of each of the webs 46 is preferably more than 2 mm, in particular more than 3 mm and/or less than 5 mm, in particular less than 4 mm, particularly preferably about 3.5 mm.

The explanations and remarks regarding the sector portions 42 in connection with the first embodiment preferably also apply to the fourth embodiment, in particular regarding the inner sides 42B and/or the outer side 42A.

As already described for the first embodiment, the outer side 42A and/or its outer contour is curved and/or arcuate.

Preferably, in the illustrative example according to the fourth embodiment, the curvature or radius of curvature of the outer side 42A and/or of the outer contour of the outer side 42A changes.

Preferably, at least in the region of the extensions 42C, the outer side 42A and/or its outer contour is more curved and/or has a smaller radius of curvature and/or a larger curvature than in the region of the outer side 42A between the extensions 42C. In particular, the radius of curvature in the region of the extensions 42C is smaller than the (actual) radius of the rotor core 40.

Particularly preferably, the curvature and/or radius of curvature of the outer side 42A and/or of the outer contour of the outer side 42A changes continuously and/or over the entire width of the outer side 42A and/or over the entire length of the outer contour. Preferably, thus, the region between the extensions 42C also has a changing curvature and/or changing radius of curvature.

Preferably, the radius of curvature is smallest at the outer edges/ends of the outer side 42A and/or outer contour and/or at the extensions 42C and/or is largest at the center. Preferably, the radius of curvature is largest at the outer edges/ends of the outer side 42A and/or outer contour and/or at the extensions 42C and/or is smallest at the center.

Preferably, the radius of curvature decreases from the center toward the extensions 42C, in particular continuously.

Preferably, the radius of curvature initially increases along the width of the outer side 42A and/or along the length of the outer contour, in particular continuously, and decreases again from the halfway or middle point. Preferably, the curvature initially decreases along the width of the outer side 42A and/or along the length of the outer contour, in particular continuously, and increases again from the halfway or middle point. Thus, the outer side 42A and/or outer contour is more curved in the direction of its ends and/or in the direction of the extensions 42C.

The maximum radius of curvature of a sector portion 42 is preferably greater than 25 mm or 30 mm, in particular greater than 35 mm, and/or less than 50 mm or 45 mm, in particular less than 40 mm. Particularly preferably, the maximum radius of curvature of a sector portion 42 is about 38.5 mm.

The radius of curvature of the outer side 42A at the transition to the extensions 42C and/or the maximum radius of curvature of an extension 42C is preferably larger than 5, 8 or 10 mm and/or smaller than 15 mm or 12 mm. If the rotor core 40 has no extensions 42C, this is preferably the minimum radius of curvature or the radius of curvature at the edges of the outer side 42A.

The minimum radius of curvature of an extension 42C and/or of the outer side 42A and/or the radius of curvature at the outer/free end of the outer side 42A and/or of the extension 42C, is preferably greater than 0.2 mm and/or less than 3 mm, 1 mm or 0.8 mm, in particular less than or equal to 0.5 mm.

Very preferably, the outer contour follows an inverse cosine function and/or can be described by an inverse cosine function, in particular according to the formula 1/cos(phi). The axis of the inverse cosine function here preferably runs in cylindrical coordinates. In other words, the sector portion 42 and/or the outer side 42A and/or the outer contour preferably has an inverse cosine pole piece geometry.

The inverse cosine function has the above-described property of a continuously changing radius of curvature, wherein the radius of curvature decreases starting from a maximum radius of curvature (at the point phi=0).

In general, the curvature described above can also be realized and advantageous in embodiments without extensions 42C, for example, the first embodiment.

The sector portions 42 preferably have one or more recesses 42D, as shown by way of example in the enlargement in FIG. 11.

The recesses 42D are preferably each formed between an inner side 42B and the extension 42C projecting therefrom.

The recesses 42D are preferably concave and/or extend transversely to the respective inner side 42B.

The recesses 42D preferably extend along the entire axial length of the sector portions 42.

A “recess” is understood here to mean that material is recessed or missing compared to a sector portion 42, where the inner side 42B meets the extension 42C directly and/or substantially orthogonally. In other words, material is recessed and/or the recess 42D is formed at the (axially extending) edge between the inner side 42B and the extension 42C.

The sector portion 42 has a smaller width (distance between the recesses 42C) in the region of the recesses 42D than a sector portion 42 that has no recesses 42D in the same region (region between inner side 42B and extension 42C).

Behind the recesses 42D (radially outward), the width of the sector portion 42 increases preferably abruptly by the extent of the extensions 42C.

The distance between two opposing recesses 42D of two adjacent sector portions 42 is preferably greater than the distance between the opposing inner sides 42B of the two adjacent sector portions 42. In other words, the width of the magnet receptacle 41 in the region of the recesses 42D is greater than the width of the magnet receptacle 41 in the region of the inner sides 42B.

In particular, the width of the magnet receptacle 41, as previously described, is at least substantially constant in the region of the inner sides 42B and, in contrast, increases in the region of the recesses 42D, in particular by the corresponding extents of the two recesses 42D (extents in the circumferential direction).

The width of the magnet receptacle 41 thus preferably increases at its radially outer end and/or at the transition from the inner sides 42B to the recesses 42D and/or between the inner sides 42B and the extensions 42C.

After mounting/assembling the rotor 2 and/or inserting and/or adhering the permanent magnets 30, in particular after the adhesive has cured, the rotor 2 is preferably balanced.

Possible or preferred balancing positions or balancing areas 40A are preferably specified (in advance). A balancing position or balancing area 40A is a (defined) location on the rotor 2, in particular on the rotor core 40, where material can be removed or added to balance the rotor 2.

The balancing areas 40A are preferably provided axially or on one or both axial end faces of the rotor core 40 or on the upper side or side of the rotor core 40 facing away from the mounting device 50 and/or on the lower side or side of the rotor core 40 facing towards the mounting device 50. Particularly preferably, balancing areas 40A are provided on both sides. The rotor 2 can thus preferably be balanced both from the side with mounting device 50 and from the side without mounting device 50.

FIGS. 10 and 11 show examples of such (axial) balancing areas 40A with dashed lines. In the illustrated example, each sector portion 42 has one or more (circular) balancing areas 40A. Particularly preferably, each sector portion 42 has four balancing areas 40A, namely two each on the side facing the mounting device 50 and two each on the side facing away from the mounting device 50. The rotor 2 shown thus preferably has (approximately) 40 different balancing areas 40A. However, other solutions are also possible here.

In order to be able to balance the rotor 2 in the assembled/mounted state (also) from below or from the side with mounting device 50, the mounting device 50, in particular the base body 51, preferably has one or more recesses/clearances 51D. Particularly preferably, the mounting device 50 or the base body 51 has a clearance 51D for each sector portion 42, as exemplarily shown in FIG. 4 and FIG. 10.

In addition or alternatively, other components not shown may also have corresponding clearances, for example a housing of the electric motor 1.

For balancing, the (original) unbalance of the rotor 2 is preferably measured first. An unbalance exists if the rotation axis A of the rotor 2 does not correspond to one of its principal inertia axes.

When the unbalance is determined, material is removed and/or added in one or more suitable balancing areas 40A. This makes the rotor 2 lighter or heavier at the appropriate balancing areas 40A, which preferably shifts the axis/axes of inertia and/or corrects or reduces the unbalance.

The process of measuring the unbalance and removing and/or adding material is preferably repeated until the unbalance of the rotor 2 falls below a desired limit.

Particularly preferably, balancing is performed by drilling. In this case, an (axial) balancing hole/balancing bore 40B is made at the corresponding balancing areas 40A, i.e. material is removed. The rotor 2 or rotor core 40 therefore preferably has a bulge or balancing hole 40B at one or more points or balancing areas 40A. FIGS. 10 and 11 show the rotor 2 with four balancing holes 40B as an example.

The balancing holes 40B are preferably set through the clearances 51D of the mounting device 50 and/or through other clearances of components not shown, such as a housing or housing part.

The material application and/or material removal, in particular the depth of the balancing holes 40B, can be variable and/or can vary depending on the existing unbalance.

The maximum depth of the balancing holes 40B is preferably greater than 4 or 5 mm and/or less than 10 or 8 mm. Particularly preferably, the maximum balancing depth is between 6 and 7 mm.

Particularly preferably, balancing is performed before magnetizing the permanent magnets 30.

Also in the previously described embodiments, corresponding balancing areas 40A and/or balancing holes 40B may be provided and/or a corresponding balancing method may be used.

The rotor 2 and/or rotor core 40 and/or the magnet receptacles 41 can have one or more magnet insertions 49, as shown by way of example in FIG. 10. The magnet insertions 49 are arranged on the open side and/or the side opposite the mounting device 50 of the rotor core 40/the magnet receptacles 41. In particular, the magnet insertions 49 are arranged (respectively) at the sector portion inner sides 42B. The magnet insertions 49 simplify insertion of the permanent magnets 30, in particular prevent canting/tilting of the permanent magnets 30 during insertion.

The mounting device 50 of the fourth embodiment is preferably formed at least substantially as in the previous embodiments. By way of example, FIGS. 10 and 11 show a mounting device 50 whose fan portion 53 has a smaller diameter than in corresponding FIGS. 4 and 5. Accordingly, the fan portion 53 of the fourth embodiment also has fewer vanes 53A. However, other solutions are also possible here.

The mounting device 50 of the fourth embodiment may also be formed or used with the rotor 2 of the first embodiment. Conversely, the mounting device 50 of the first embodiment may also be formed or used with the rotor 2 of the fourth embodiment.

Of course, in the fourth embodiment, it is also possible to form the mounting device 50 without fan portion 53 and/or with fastening elements 56, as described for the second and third embodiment.

Figure 12:
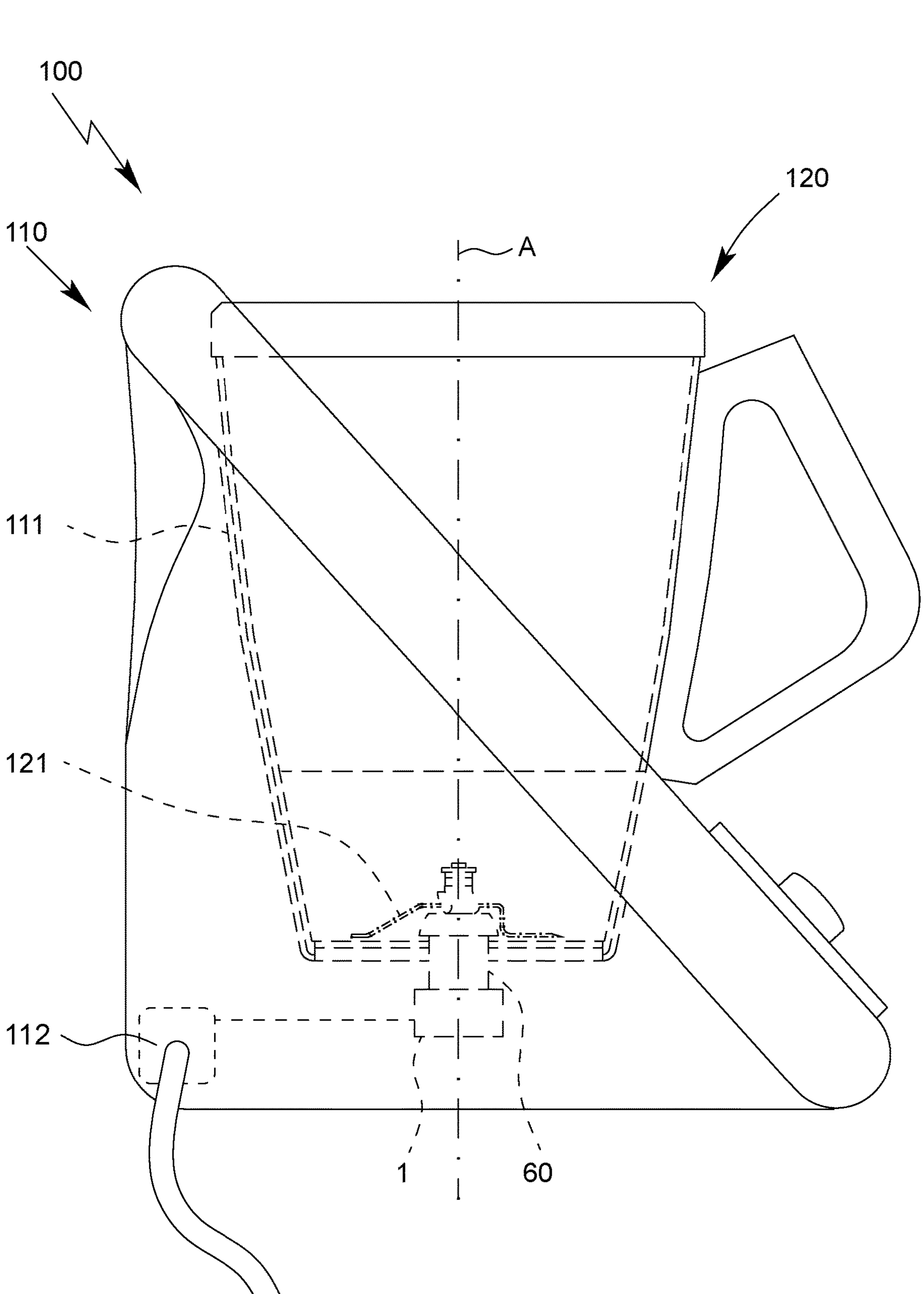
FIG. 12 is a side view of a proposed kitchen machine.

FIG. 12 schematically shows a proposed cooking apparatus/food processor/kitchen machine 100 for the preparation of meals and/or for the processing of food/ingredients. The kitchen machine 100 is preferably an electrically operated multi-functional kitchen machine/food processor designed for chopping, stirring/mixing and/or heating/cooking food.

The kitchen machine 100 preferably has a base station 110 and/or a vessel/container 120 to receive/hold food.

The base station 110 and the vessel 120 are preferably electrically and/or mechanically connected or connectable, in particular to allow heating and/or mixing/stirring of the food in the vessel 120.

FIG. 12 shows the kitchen machine 100 in its usual state of use and/or in the connection position, in which the vessel 120 is electrically and/or mechanically connected to the base station 110.

The base station 110 preferably has a receptacle 111 to receive/accommodate the vessel 120 at least partially and/or at the bottom. Particularly preferably, the vessel 120 is at least partially insertable or suspendable in the base station 110 in order to connect the vessel 120 mechanically and/or electrically to the base station 110.

The vessel 120 is equipped with a stirrer 121, in particular for comminuting/chopping and/or mixing/stirring food in the vessel 120. The stirrer 121 is preferably rotatably mounted and/or located at the bottom of the vessel 120. The stirrer 121 preferably has a plurality of, in particular exchangeable, stirring paddles/blades.

Preferably, the stirring blades have cutting edges or are designed as cutting blades to chop up food.

Preferably, the vessel 120 is mechanically connected or connectable to the base station 110 to drive the stirrer 121 by means of the base station 110.

To drive the stirrer 121, the kitchen machine 100, in particular the base station 110, has the electric motor 1, which is connected or connectable to the stirrer 121 via the shaft 60—optionally via a shaft attachment—and/or—in the connection position—engages positively/form-fittingly in the bottom of the vessel 120 from below.

Preferably, the rotation axis A of the electric motor 1 corresponds to the rotation axis of the stirrer 121 and/or to a central axis of the vessel 120, which extends centrally through the vessel 120, as indicated in FIG. 12.

Preferably, the central axis is a longitudinal or symmetrical axis of the preferably elongated, cylindrical and/or at least substantially rotationally symmetrical vessel 120.

The kitchen machine 100, in particular the base station 110, preferably has a power supply 112 for supplying electrical power to the electric motor 1, in particular its coils 11, and/or to other devices of the kitchen machine 100.

Depending on the rotational speed or number of revolutions of the stirrer 121 and/or electric motor 1, the kitchen machine 100 is preferably designed both for mixing/stirring (at low rotational speeds) and for comminuting/chopping (at high rotational speeds) ingredients. Particularly preferably, also slow mixing/stirring, for example at 10 rpm, and/or very fine or defined comminution/chopping, for example at 10,000 rpm, is possible.

Individual aspects, features and/or method steps of the present invention can be implemented independently, but also in any combination and/or sequence.

LIST OF REFERENCE SIGNS

1 Electric motor
10 Stator

11 Coil
12 Stator core
12A Stator sheet
12B Coil portion
13 Coil carrier
14 Connection device
14A Electrical connection
14B Connection carrier
20 Rotor
30 Permanent magnet
31 Insertion chamfer
32 Flat side
40 Rotor core
40A Balancing area
40B Balancing hole
41 Magnet receptacle
42 Sector portion
42A Outer side
42B Inner side
42D Extension
42D Recess
43 Inner portion
43A Opening
43B Connecting portion
44 Rotor sheet
44A Punch area
45 Stop
45A Stop surface
46 Web
47 Lug
48 Aperture
49 Magnet insertion
50 Mounting device
51 Base body
51 Outer portion
51B Inner portion
51C Connecting portion
51D Clearance
52 Fixing element
52A Head
52B Arm
52C Joining portion
52D Contact surface
52E Chamfer
53 Fan portion
53A Vane
54 Stop element
54A Transversely extending stop element
54B Radially extending stop element
55 Receiving chamber
56 Fastening element
56A Head
60 Shaft
61 Protrusion
70 Guide device
71 Recess
72 Guide edge
100 Kitchen machine
110 Base station
111 Receptacle
112 Power supply
120 Vessel
121 Stirrer
A Rotation axis
R Introduction direction

The invention claimed is:

1. An electric motor comprising:

a rotor and a stator, wherein the rotor is rotatable about a rotation axis relative to the stator, the rotor comprising:

a rotor core formed by stacked rotor sheets, the rotor core comprising magnet receptacles which are each delimited radially outwardly by a radial stop, a plurality of permanent magnets, each permanent magnet being inserted into a magnet receptacle, and a mounting device with a base body for mounting the permanent magnets, wherein the permanent magnets are adhesively bonded to the rotor core and/or the mounting device, wherein the mounting device has at least partially flexible fixing elements for fixing the permanent magnets, the fixing elements each projecting from the base body in the axial direction into the magnet receptacles and pressing the permanent magnets in the radial direction against the stops, and wherein the mounting device axially delimits the magnet receptacles and forms respective axial stops for the permanent magnets, wherein the base body forms one or more receiving chambers for receiving overdosed adhesive when adhesively bonding the permanent magnets to the rotor core and/or to the mounting device.

2. The electric motor according to claim 1, wherein the mounting device is integrally formed and/or is injection-molded.

3. The electric motor according to claim 1, wherein the rotor comprises a fan for cooling the electric motor, wherein the fan forms the mounting device.

4. The electric motor according to claim 1, wherein the one or more receiving chambers are arranged axially below the permanent magnets and are axially open toward the permanent magnets.

5. The electric motor according to claim 1, wherein the mounting device comprises or forms a stop element as axial stop for one or more permanent magnets, wherein the stop element laterally delimits one or more receiving chambers.

6. The electric motor according to claim 1, wherein the mounting device has a plurality of receiving chambers for receiving adhesive, wherein each magnet receptacle and/or each permanent magnet is assigned at least one receiving chamber.

7. The electric motor according to claim 1, wherein the radial stops for the permanent magnets are formed by one, multiple or all rotor sheets.

8. The electric motor according to claim 1, wherein the radial stops are formed as webs and/or are bent radially inwards and/or into the respective magnet receptacles, and/or wherein the radial stops each have lugs which project in the radial direction into the magnet receptacles and form a contact surface for the respective permanent magnet.

9. The electric motor according to claim 1, wherein the fixing elements each extend into the magnet receptacles at least substantially up to half of the axial extent of the magnet receptacles and/or press at least substantially centrally onto a radially inwardly facing end face of the respective permanent magnet.

10. The electric motor according to claim 1, wherein the fixing elements each have a head which presses with a radially outer contact surface against the permanent magnet and/or rests thereon.

11. The electric motor according to claim 1, wherein the mounting device has pinlike fastening elements which project axially through the rotor core and fasten the mounting device to the rotor core.

12. An electric motor comprising:

a rotor and a stator, wherein the rotor is rotatable about a rotation axis relative to the stator, the rotor having a rotor core with magnet receptacles which are each delimited radially outwardly by a radial stop, wherein the rotor has a plurality of permanent magnets, each permanent magnet being inserted into a magnet receptacle, wherein the rotor has a mounting device with a base body for mounting the permanent magnets, wherein the permanent magnets are adhesively bonded to the rotor core and/or the mounting device, and wherein the mounting device axially delimits the magnet receptacles and forms respective axial stops for the permanent magnets, wherein the base body forms one or more receiving chambers for receiving overdosed adhesive when adhesively bonding the permanent magnets to the rotor core and/or to the mounting device, wherein the one or more receiving chambers are arranged axially below the permanent magnets and are axially open toward the permanent magnets.

13. The electric motor according to claim 12, wherein the mounting device is integrally formed and/or is injection-molded.

14. The electric motor according to claim 12, wherein the rotor comprises a fan for cooling the electric motor, wherein the fan forms the mounting device.

15. The electric motor according to claim 12, wherein the mounting device comprises or forms a stop element as axial stop for one or more permanent magnets, wherein the stop element laterally delimits one or more receiving chambers.

16. The electric motor according to claim 12, wherein the mounting device has a plurality of receiving chambers for receiving adhesive, wherein each magnet receptacle and/or each permanent magnet is assigned at least one receiving chamber.

17. A method of assembling an electric motor having a stator and a rotor rotatable relative to the stator about a rotation axis, wherein the rotor has a rotor core with magnet receptacles each of which is delimited radially outwardly by a radial stop, the method comprising:

inserting a permanent magnet into one of the magnet receptacles and adhesively bonding the permanent magnet to the rotor core, using a mounting device of the rotor when adhesively bonding the permanent magnet, wherein a base body of the mounting device axially delimits the magnet receptacle, pushing the permanent magnet into the magnet receptacle during insertion until it axially abuts the mounting device, and receiving overdosed adhesive in a receiving chamber formed by the base body of the mounting device, the receiving chamber being arranged axially below the permanent magnets and axially open toward the permanent magnets.

18. A method according to claim 17, further comprising, during insertion of the permanent magnet, pressing the permanent magnet in radial direction against the associated stop to fix the permanent magnet during curing of adhesive, the pressing being performed by an at least partially flexible fixing element of the mounting device which projects axially into the magnet receptacle.

19. A method according to claim 17, further comprising inserting the permanent magnet into the magnet receptacle until it axially stops against a stop element formed by the mounting device.

20. A method according to claim 17, further comprising temporarily using a guide device during insertion of the permanent magnet which forms a guide for the permanent magnet.

21. A method according to claim 17, further comprising magnetizing the permanent magnet only after insertion or only after curing of the adhesive.

22. The electric motor according to claim 12, wherein the mounting device is integrally formed and comprises blades such that the mounting device forms a fan for cooling the electric motor.

* * * * *